United States Patent
Kadotani et al.

(10) Patent No.: US 9,547,645 B2
(45) Date of Patent: Jan. 17, 2017

(54) MACHINE TRANSLATION APPARATUS, TRANSLATION METHOD, AND TRANSLATION SYSTEM

(71) Applicant: FUJITSU LIMITED, Kawasaki-shi, Kanagawa (JP)

(72) Inventors: Masataka Kadotani, Kawasaki (JP); Tomoki Nagase, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/597,308

(22) Filed: Jan. 15, 2015

(65) Prior Publication Data
US 2015/0205788 A1 Jul. 23, 2015

(30) Foreign Application Priority Data
Jan. 22, 2014 (JP) ................. 2014-009862

(51) Int. Cl.
*G06F 17/27* (2006.01)
*G06F 17/28* (2006.01)

(52) U.S. Cl.
CPC .......... *G06F 17/289* (2013.01); *G06F 17/271* (2013.01); *G06F 17/2785* (2013.01); *G06F 17/2872* (2013.01)

(58) Field of Classification Search
CPC ...................................... G06F 17/28
USPC ........................................ 704/2–8
See application file for complete search history.

(56) References Cited

U.S. PATENT DOCUMENTS

| | | | | | |
|---|---|---|---|---|---|
| 5,867,811 | A * | 2/1999 | O'Donoghue | ...... | G06F 17/2827 704/1 |
| 6,085,162 | A * | 7/2000 | Cherny | ............... | G06F 17/2735 704/2 |
| 6,182,026 | B1 * | 1/2001 | Tillmann | ............ | G06F 17/2809 704/2 |
| 6,195,631 | B1 * | 2/2001 | Alshawi | ............. | G06F 17/2827 704/2 |
| 6,236,958 | B1 * | 5/2001 | Lange | ................. | G06F 17/2827 704/8 |
| 8,131,536 | B2 * | 3/2012 | Weischedel | ......... | G06F 17/2229 704/2 |

(Continued)

FOREIGN PATENT DOCUMENTS

| | | |
|---|---|---|
| JP | 08-235186 | 9/1996 |
| JP | 2000-250914 | 9/2000 |

(Continued)

*Primary Examiner* — Jesse Pullias
(74) *Attorney, Agent, or Firm* — Staas & Halsey LLP

(57) ABSTRACT

A machine translation apparatus configured to translate an input sentence and output a translated sentence in a target language, the machine translation apparatus includes a rule acquirer configured to acquire a difference between an input example sentence and a replaced example sentence which is obtained by replacing the input example sentence, and acquire a replacement rule based on the difference and each of meaning representations which indicate each relationship of words in the input example sentence and the replaced example sentence; and a translator configured to apply the replacement rule acquired by the rule acquirer to the input sentence and output the translated sentence based on the meaning representations and a meaning representation indicating of relationship of words in the input sentence.

9 Claims, 28 Drawing Sheets

(56) References Cited

U.S. PATENT DOCUMENTS

| | | | |
|---|---|---|---|
| 2001/0029455 A1* | 10/2001 | Chin | G06F 17/273 704/277 |
| 2006/0106595 A1* | 5/2006 | Brockett | G06F 17/2785 704/9 |
| 2008/0154577 A1* | 6/2008 | Kim | G06F 17/2827 704/2 |
| 2008/0288241 A1* | 11/2008 | Noda | G06F 17/2836 704/4 |
| 2011/0055228 A1 | 3/2011 | Tsuchida et al. | |
| 2012/0150529 A1* | 6/2012 | Kim | G06F 17/289 704/2 |
| 2012/0232882 A1* | 9/2012 | Zhang | G06F 17/2827 704/2 |

FOREIGN PATENT DOCUMENTS

| | | |
|---|---|---|
| JP | 2000-268034 | 9/2000 |
| JP | 2010-244385 | 10/2010 |
| WO | WO 2009/123260 | 10/2009 |

\* cited by examiner

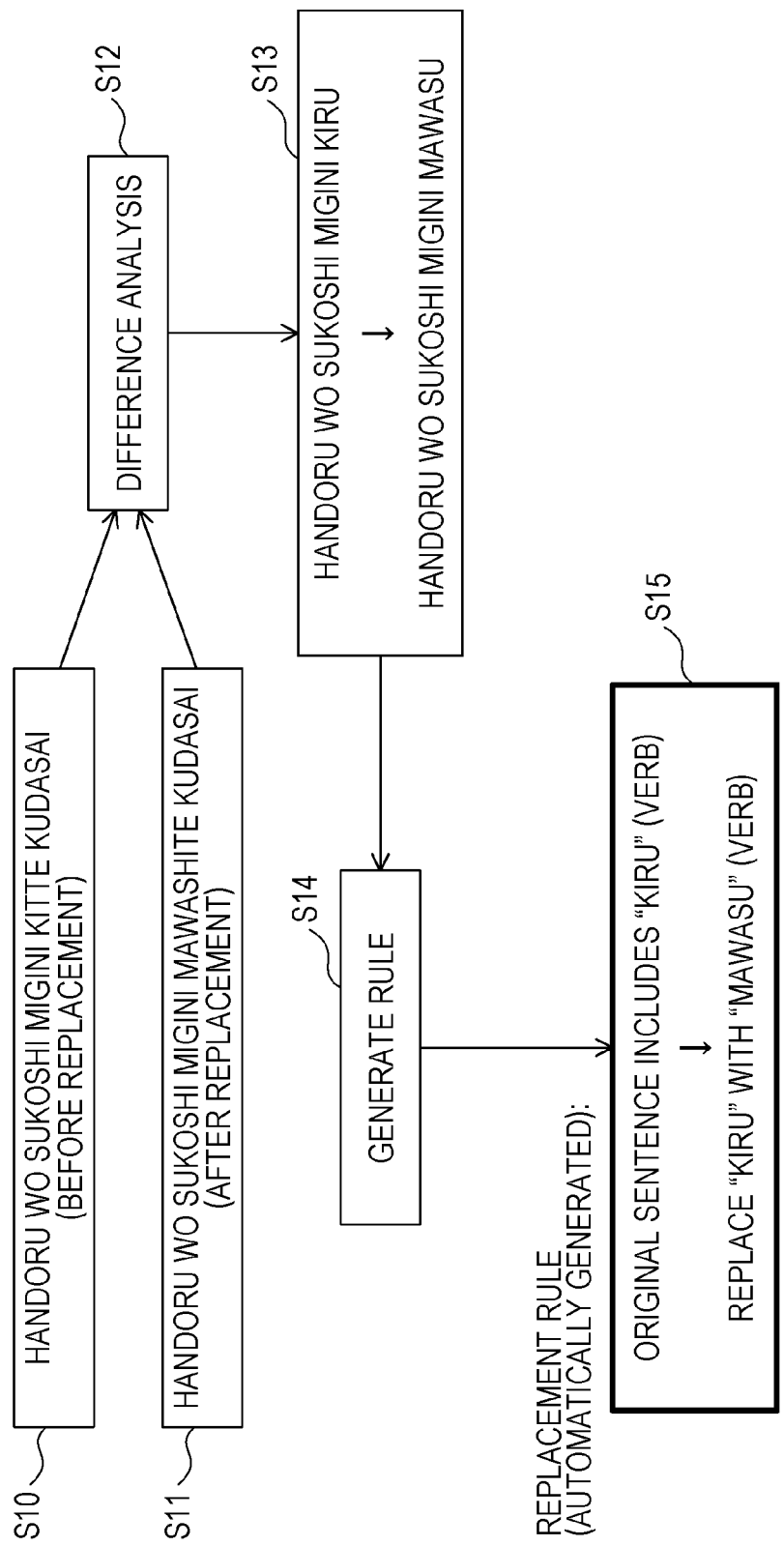

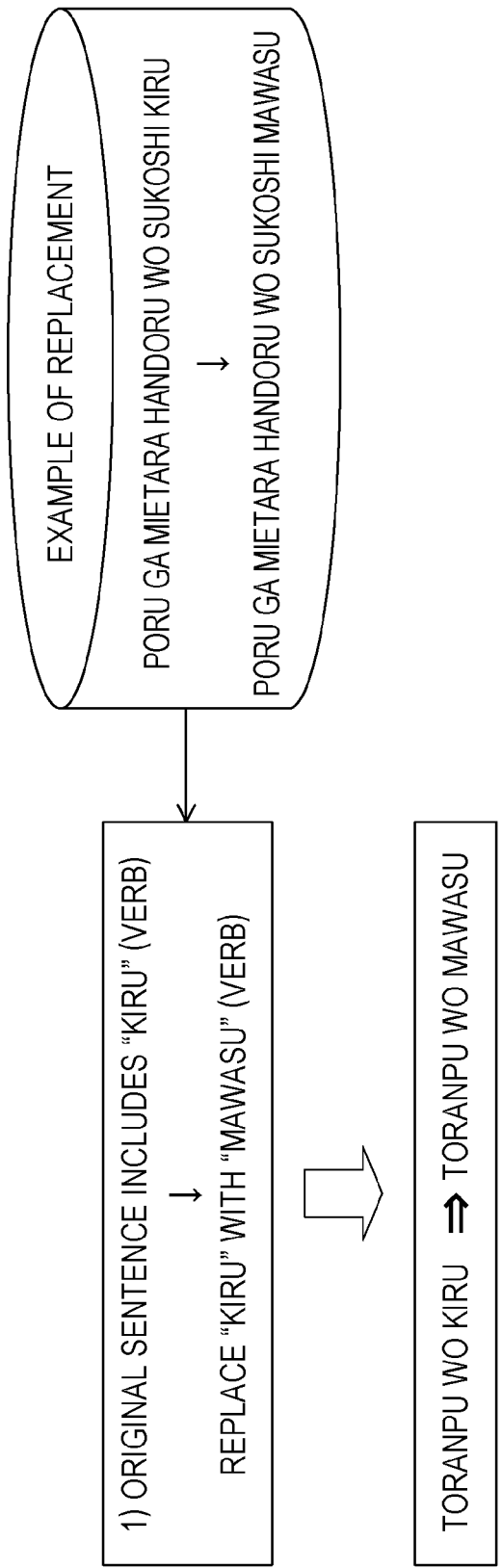

FIG. 2B
RELATED ART
1) ORIGINAL SENTENCE INCLUDES "KIRU" (VERB)
2) ORIGINAL SENTENCE INCLUDES "HANDORU" AND "WO" BEFORE "KIRU"
REPLACE "KIRU" WITH "MAWASU" (VERB)
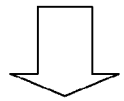
TORANPU WO KIRU ⇒ —

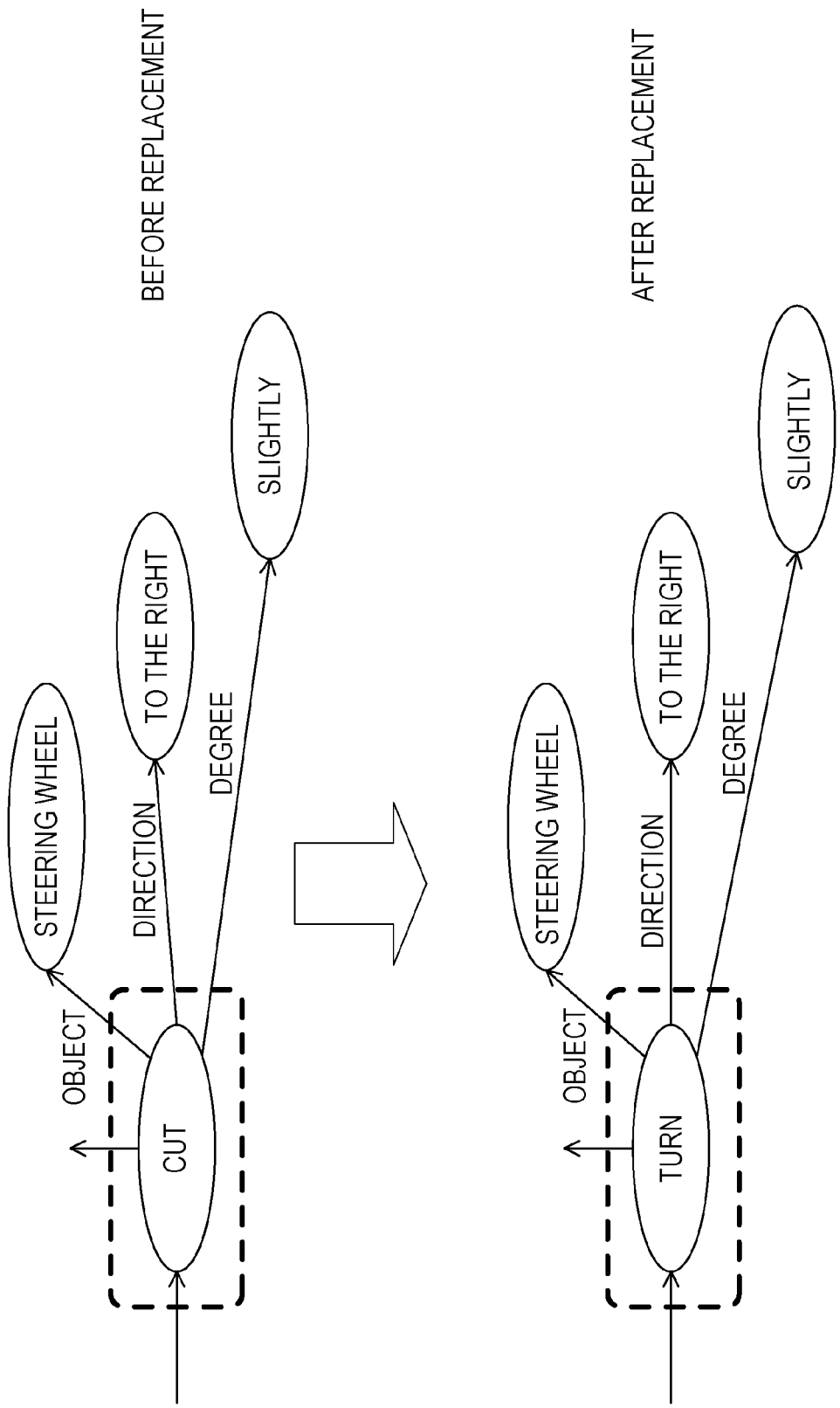

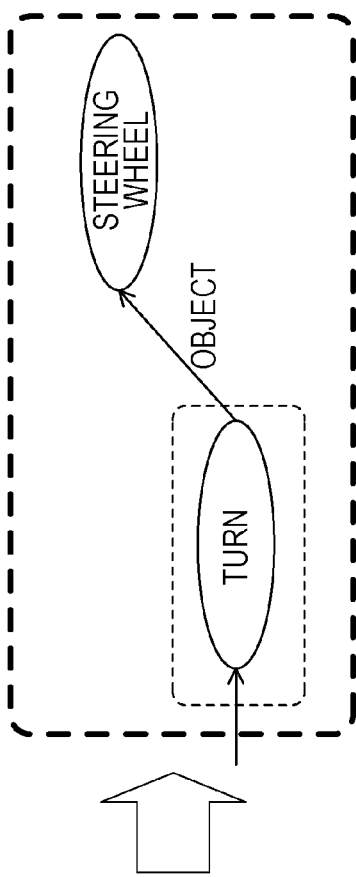
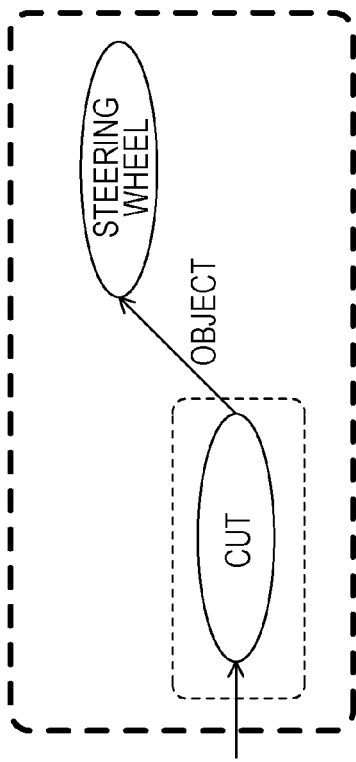
FIG. 6

INPUT SENTENCE: "KARE WA HANDORU WO SUBAYAKU KIRU"

RESULTS OF ANALYZING ORIGINAL SENTENCE
(MEANING REPRESENTATIONS):

MEANING REPRESENTATION CONVERSION:

GENERATION OF TRANSLATED SENTENCE:
    HE TURNS THE STEERING WHEEL QUICKLY

INPUT SENTENCE: "HANDORU WO MOTTE NEJIYAMA WO KITTE KUDASAI"

RESULTS OF ANALYZING ORIGINAL SENTENCE (MEANING REPRESENTATIONS):

MEANING REPRESENTATION CONVERSION:

NO WORD MATCHING RULE

GENERATION OF TRANSLATED SENTENCE:
PLEASE CUT THE SCREW THREAD WITH THE STEERING WHEEL

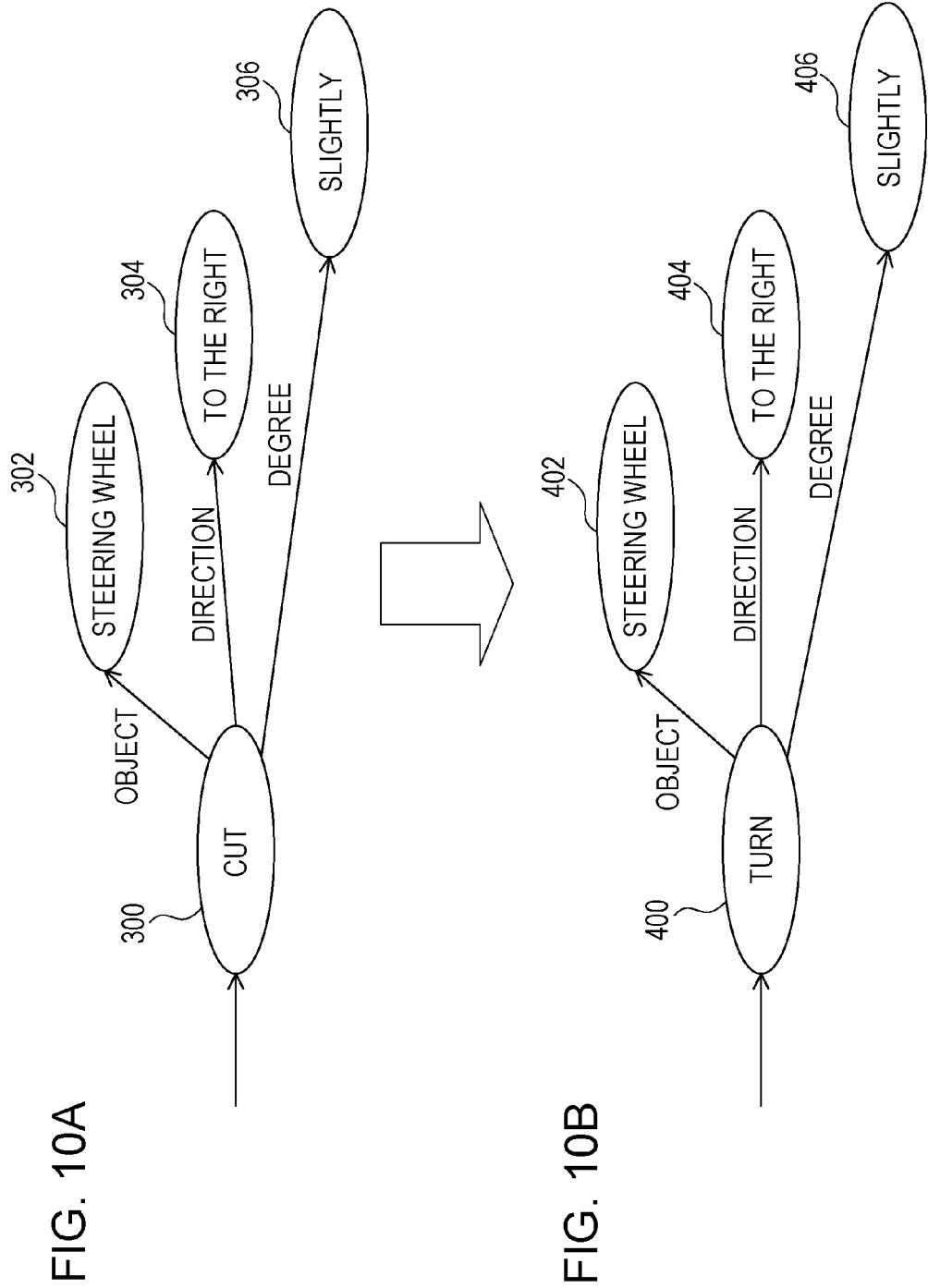

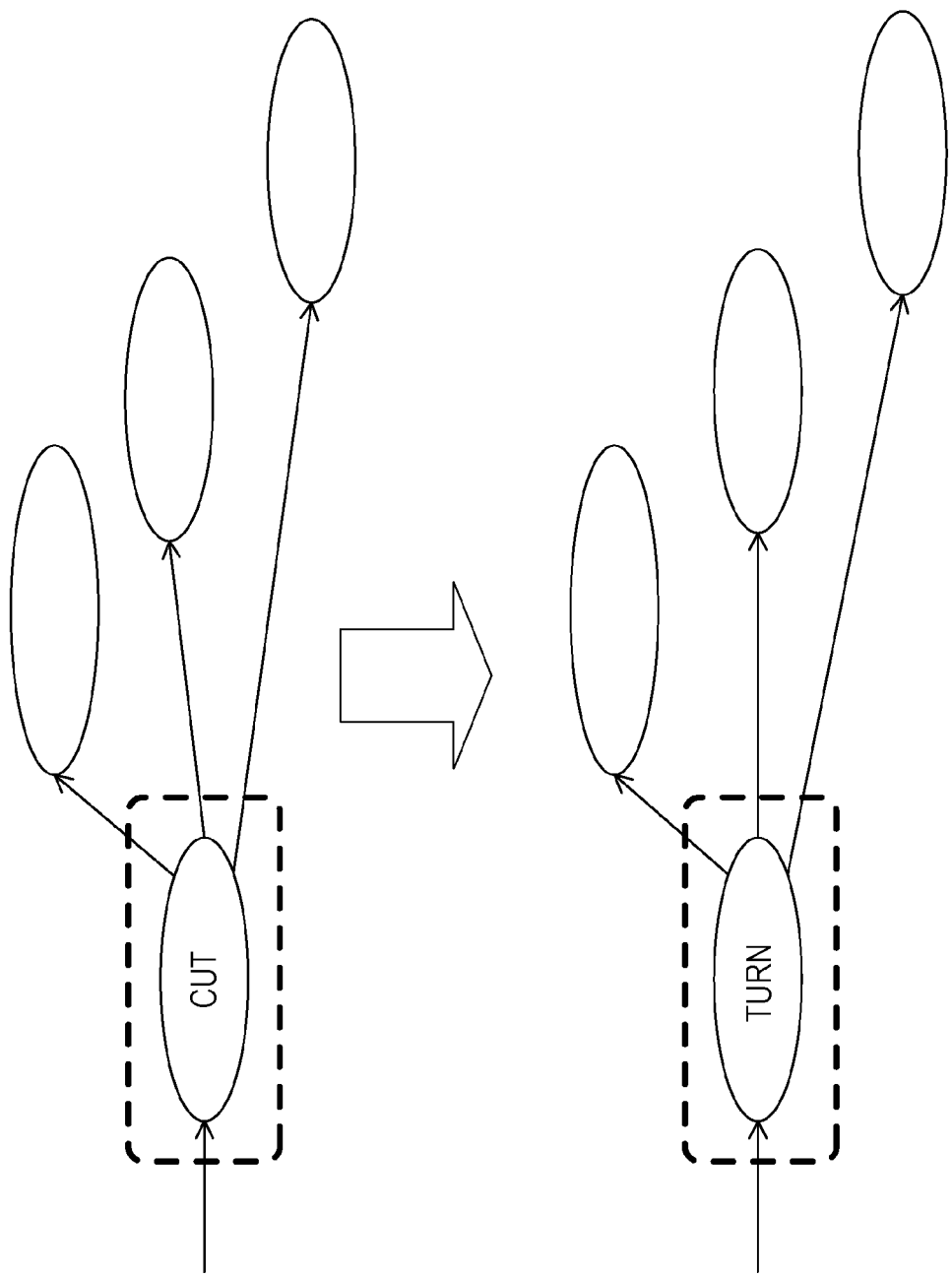

FIG. 14
INPUT SENTENCE: "HANDORU WO MOTTE NEJIYAMA WO KITTE KUDASAI"
RESULTS OF ANALYZING ORIGINAL SENTENCE (MEANING REPRESENTATIONS):
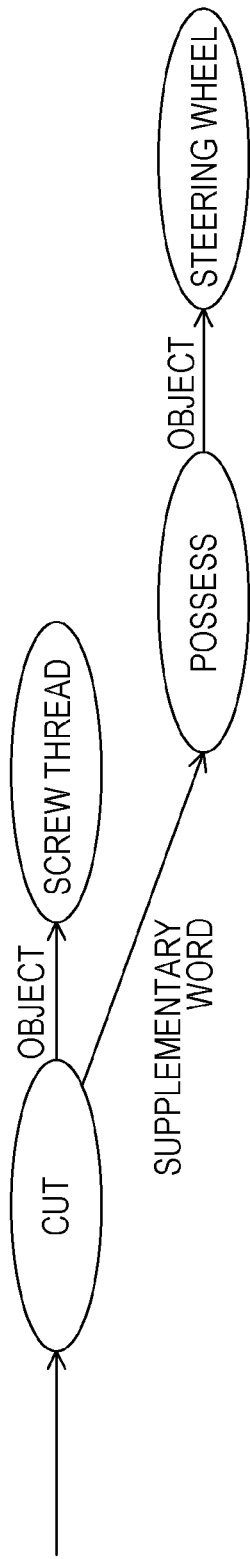
MEANING REPRESENTATION CONVERSION:
NO WORD MATCHING RULE
GENERATION OF TRANSLATED SENTENCE:
PLEASE CUT THE SCREW THREAD WITH THE STEERING WHEEL. (CORRECT)

FIG. 16

| RECORD # | ITEM | VALUE |
|---|---|---|
| 1 | NUMBER OF TUPLES | 2 |
| 1 | TUPLE [0] BEFORE REPLACEMENT | (CUT, DIRECTION, TO THE RIGHT) |
| 1 | TUPLE [1] AFTER REPLACEMENT | (TURN, DIRECTION, TO THE RIGHT) |
| 2 | NUMBER OF TUPLES | 2 |
| 2 | TUPLE [2] BEFORE REPLACEMENT | (CUT, OBJECT, STEERING WHEEL) |
| 2 | TUPLE [3] AFTER REPLACEMENT | (TURN, OBJECT, STEERING WHEEL) |
| 3 | ... | ... |

BEFORE REPLACEMENT: "THE NOISE IS ISSUED BY THE TRANSISTOR."
(= ZATSUON WA TORANJISUTA NIYOTTE HAKKOUSARERU)

AFTER REPLACEMENT: "THE NOISE IS GENERATED BY THE TRANSISTOR."
(= ZATSUON WA TORANJISUTA NIYOTTE HASSEISURU)

MACHINE TRANSLATION APPARATUS, TRANSLATION METHOD, AND TRANSLATION SYSTEM

CROSS-REFERENCE TO RELATED APPLICATION

This application is based upon and claims the benefit of priority of the prior Japanese Patent Application No. 2014-009862 filed on Jan. 22, 2014, the entire contents of which are incorporated herein by reference.

FIELD

The embodiments discussed herein are related to a machine translation apparatus, a translation method, a translation system, and a computer recording medium having stored therein a translation program.

BACKGROUND

Translation from a certain language to another language that is executed using a natural language processing system is referred to as machine translation in some cases. A machine translation apparatus is known as an apparatus for automatically translating, into Japanese sentences, science technology articles, patent specifications, specifications of devices, instruction manuals of devices, news reports, and the like that are written in other languages. An accuracy rate of translation by the machine translation is approximately in a range of from 70% to 80%, and there may be a certain error in the translation.

For example, a technique is known, which replaces, with standard representations, words that are included in a part that is to be pre-edited and is included in a text and have been detected based on the identification of the type of the text and a pre-edition rule corresponding to the type of the text in a process of pre-editing the text written in a natural language.

Japanese Laid-open Patent Publication No. 2000-268034 is an example of related art.

SUMMARY

According to an aspect of the invention, a machine translation apparatus configured to translate an input sentence and output a translated sentence in a target language, the machine translation apparatus includes a rule acquirer configured to acquire a difference between an input example sentence and a replaced example sentence which is obtained by replacing the input example sentence, and acquire a replacement rule based on the difference and each of meaning representations which indicate each relationship of words in the input example sentence and the replaced example sentence; and a translator configured to apply the replacement rule acquired by the rule acquirer to the input sentence and output the translated sentence based on the meaning representations and a meaning representation indicating of relationship of words in the input sentence.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram describing a comparative example;

FIG. 2A is a diagram describing an example of a replacement rule that is a problem with the comparative example and automatically generated from an example sentence;

FIG. 2B is a diagram describing an example of a rule that is a problem with the comparative example and added by a person in order to avoid inappropriate application;

FIG. 3 is a diagram describing an outline of embodiments and illustrating results (meaning representations) of analyzing original sentences;

FIG. 6 is a diagram illustrating a rule to be added;

FIGS. 10A and 10B are diagrams describing an operation according to the first embodiment;

FIG. 11 is a diagram describing a process to be executed by an additional rule determining unit;

FIG. 14 is a diagram illustrating an example in which translation is executed so as to generate a correct translated sentence without inappropriately applying a replacement rule;

FIG. 16 is a diagram illustrating an image of the storage of the replacement rules in the DB;

DESCRIPTION OF EMBODIMENTS

Figure 4:
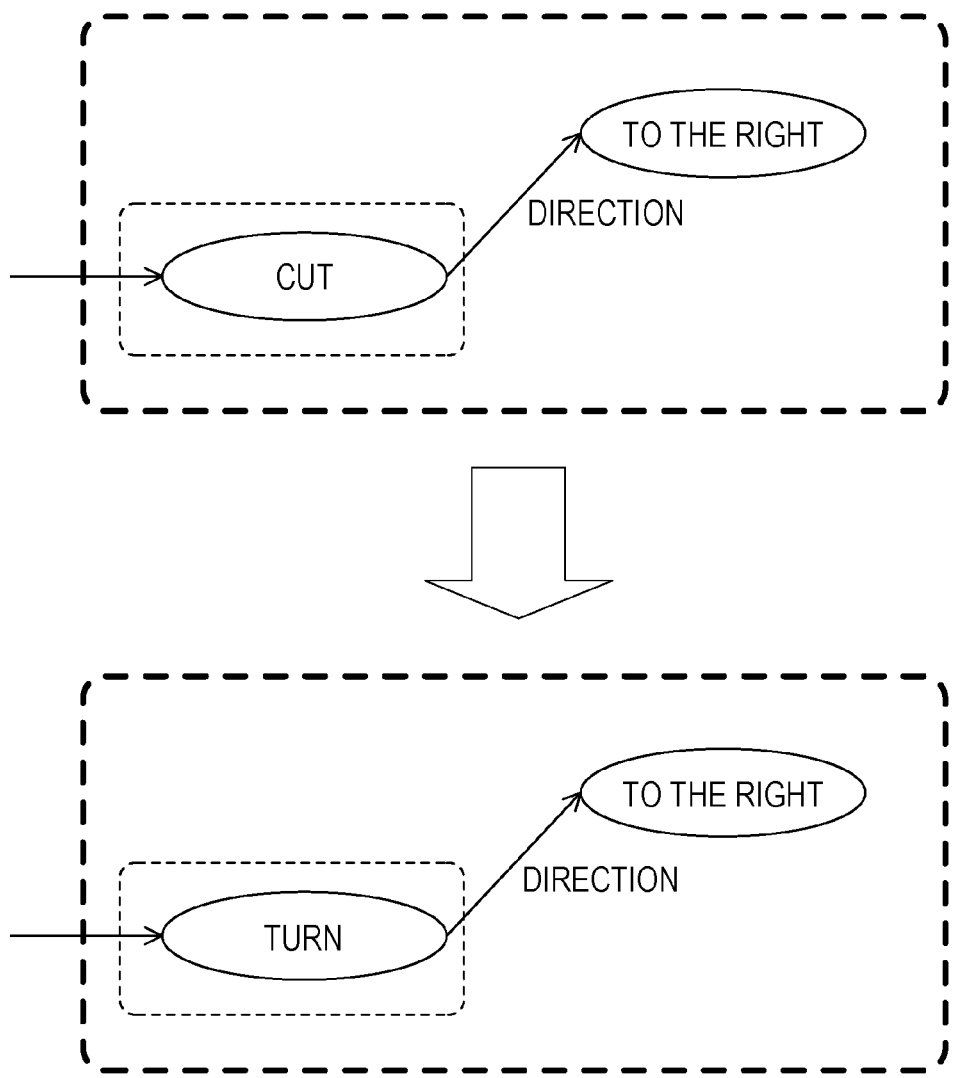
FIG. 4 is a diagram describing the outline of the embodiments and addition to a rule for converting meaning representations.

A sentence initially translated from an original sentence may include an inappropriate word. In this case, it is considered that the machine translation apparatus executes a process of replacing the inappropriate word. When the word is simply replaced in accordance with a rule for rewriting the original sentence, a replacement process may be inappropriately applied. For example, when the original sentence is a sentence "PORU GA MIETARA HANDORU WO SUKOSHI KIRU" (meaning that "slightly turn the steering wheel if you see a pole") and includes a word "KIRU" (verb), the original sentence is converted into a sentence "PORU GA MIETARA HANDORU WO SUKOSHI MAWASU" (meaning that "slightly turn the steering wheel if you see a pole") by replacing "KIRU" with "MAWASU". However, when the rule is applied to a sentence "TORANPU WO KIRU" (meaning that "shuffle the cards"), the sentence "TORANPU WO KIRU" is converted into a sentence "TORANPU WO MAWASU" (meaning that "turn the cards").

It is desired to provide a machine translation apparatus, a translation method, and a program, which may improve the accuracy of translation.

Hereinafter, embodiments of a machine translation apparatus that may improve the accuracy of translation by collecting example sentences in an environment in which machine translation is interactively executed are described.

First, a comparative example is described with reference to FIGS. 1 to 2B. After that, the embodiments of the machine translation apparatus are described with reference to FIGS. 3 to 28.

COMPARATIVE EXAMPLE

FIG. 1 is a diagram describing the comparative example. FIG. 1 describes a process of generating a replacement rule.

As illustrated in FIG. 1, it is assumed that a sentence "HANDORU WO SUKOSHI MIGINI KITTE KUDASAI" (meaning that "please turn the steering wheel slightly to the right") before replacement is prepared (in S10) and a sentence "HANDORU WO SUKOSHI MIGINI MAWASHITE KUDASAI" (meaning that "please turn the steering wheel slightly to the right") after the replacement is prepared (in S11).

In difference analysis (in S12), a difference between the sentence "HANDORU WO SUKOSHI MIGINI KITTE KUDASAI" before the replacement and the sentence "HANDORU WO SUKOSHI MIGINI MAWASHITE KUDASAI" after the replacement is calculated. In this case, as indicated by S13, the formal sentences are replaced with normal sentences "HANDORU WO SUKOSHI MIGINI KIRU" (meaning that "turn the steering wheel slightly to the right") and "HANDORU WO SUKOSHI MIGINI MAWASU" (meaning that "turn the steering wheel slightly to the right") and the difference between the two sentences is acquired. As a result of calculating the difference, a change from a verb "KIRU" to a verb "MAWASU" is detected.

In response to the result of S13, a replacement rule is generated in S14. In this case, as indicated by S15, when the original sentence includes the verb "KIRU", the rule for replacing the verb "KIRU" with the verb "MAWASU" is automatically generated.

FIG. 2A is a diagram illustrating an example of the replacement rule that is a problem with the comparative example and automatically generated from the example sentence.

As illustrated in FIG. 2A, when a differential character string is simply replaced in accordance with the rule for replacing the word of the original sentence, the rule may be inappropriately applied. For example, when the verb "KIRU" is detected, the verb "KIRU" is simply replaced with the verb "MAWASU" in accordance with the rule for replacing the verb "KIRU" with the verb "MAWASU". Thus, when a sentence "TORANPU WO KIRU" (meaning that "shuffle the cards") exists, the sentence is replaced with a sentence "TORANPU WO MAWASU" (meaning that "turn the cards").

FIG. 2B is a diagram describing a problem with a modification of the comparative example.

In the comparative example illustrated in FIG. 2A, the replacement rule may be inappropriately applied. The inappropriate application may be avoided by setting an appropriate additional rule in the replacement rule by a person in order to improve the comparative example.

For example, as requirements provided by a person, it is considered that the verb "KIRU" is replaced with the verb "MAWASU" when the original sentence includes followings, 1) the original sentence includes the verb "KIRU", and
2) the original sentence includes words "HANDORU" and "wo" before the verb "KIRU".

In this case, the original sentence "HANDORU WO SUKOSHI MIGINI KIRU" is correctly replaced with the sentence "HANDORU WO SUKOSHI MIGINI MAWASU". In addition, since the sentence "TORANPU WO KIRU" does not include the word "HANDORU" before the verb "KIRU", the replacement rule is not used and the sentence "TORANPU WO KIRU" is maintained without any change.

However, in order to set an additional rule, a person has to have knowledge of dependence relationships between words. Thus, the set additional rule is not always set appropriately. In the aforementioned method, the additional rule that is provided in order to avoid inappropriate application of the replacement rule is difficult to be automatically set.

Embodiments

A first embodiment is described below with reference to FIGS. 3 to 21.

In the first embodiment, syntactic and semantic analysis is executed on original sentences before and after replacement, and modification relations between words are used for setting of a rule. In addition, an additional rule is set based on appearance frequencies of combinations of modification relations between words to be subjected to replacement and the like.

Specifically, when an example to be used to rewrite the original sentence is input in order to improve translation, 1) the syntactic and semantic analysis is executed on the original sentences before and after the replacement and meaning representations of the original sentences before and after the replacement are generated;
2) meaning representations that correspond to a difference between the original sentences before and after the replacement are identified, and whether or not an additional rule is to be set is determined;
3) a model, such as a modification relation frequency table or the like, of a target language is referenced and the additional rule is identified; and 4) the additional rule is accumulated in a replacement rule database as a rule for converting meaning representations.

The meaning representations are results, representing relations between conceptual symbols using a digraph, of the syntactic and semantic analysis.

As illustrated in FIG. 3, it is assumed that the original sentence before the replacement is a sentence "HANDORU WO SUKOSHI MIGINI KITTE KUDASAI" and that the original sentence after the replacement is a sentence "HANDORU WO SUKOSHI MIGINI MAWASHITE KUDASAI". Results of replacing the sentences with English words and executing the syntactic and semantic analysis are illustrated in FIG. 3.

Japanese words "HANDORU", "SUKOSHI", "MIGINI", and "KITTE" are replaced with English words "steering wheel", "slightly", "to the right", and "cut", respectively. By the replacement, "KITTE" is replaced with "MAWASHITE", and "cut" is replaced with "turn". The word "cut" that serves as a verb, the words "steering wheel" that serve as an object of the verb, the words "to the right" that serve as a direction of the verb, and the word "slightly" that serves as a degree of the verb are obtained as meaning representations as a result of the syntactic and semantic analysis. The same applies to the sentence after the replacement except that "turn" is detected as the verb instead of "cut".

Then, the validity of a range, corresponding to the difference between the original sentences before and after the replacement, of the meaning representations of the original sentences is determined. For example, it is considered that when each of words detected as the difference is treated as a single node, whether or not the number of nodes included in the difference is two or more is determined. It may be determined that when the answer is negative (or the number of the nodes included in the difference is one (only the word "cut" is a node included in the difference)), an additional rule is not provided. It may be determined that when the answer is positive, the additional rule is provided.

A meaning-representation-conversion-rule generator generates a rule including an additional rule. For example, as a rule to be added to a rule for converting a meaning representation, requirements may be added for nodes ("HANDORU", "SUKOSHI", "MIGINI", and the like for "KITTE" in the example illustrated in FIG. 3) that are adjacent to a node detected as a difference.

For example, as illustrated in FIG. 4, when there is a node that is adjacent to "cut" and "turn" that are included in the difference and indicates a direction as a semantic content, "turn" is selected instead of "cut".

Figure 5A:
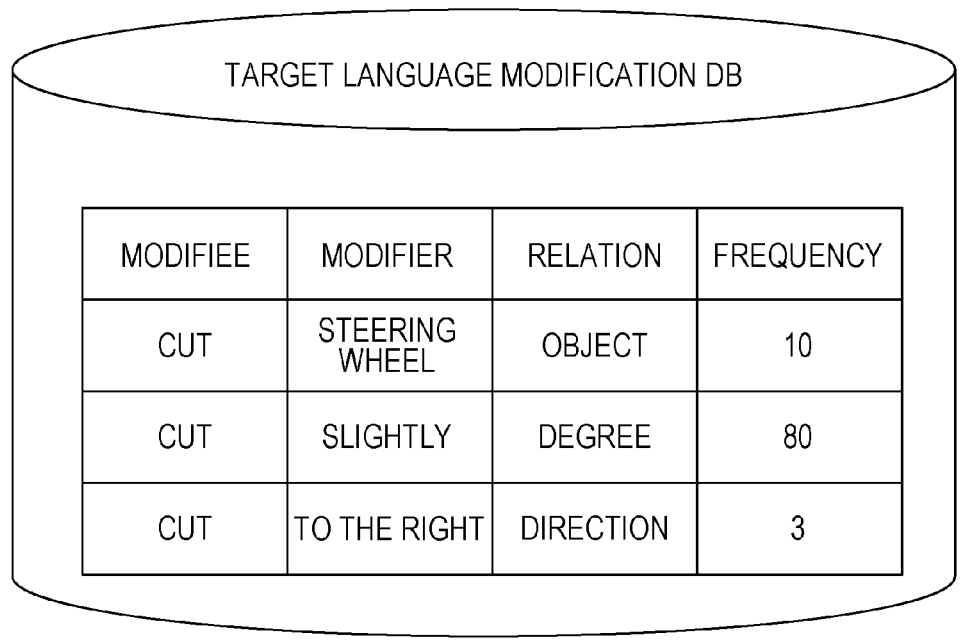
FIG. 5A is a diagram describing an additional rule generator.
Figure 5B:
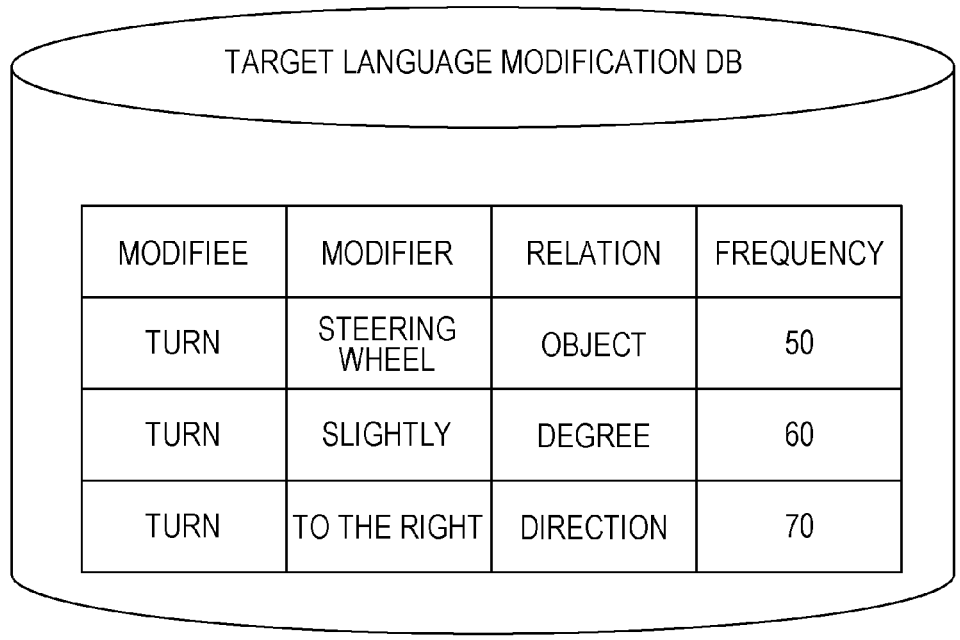
FIG. 5B is a diagram describing the additional rule generator.

FIGS. 5A and 5B are diagrams describing the acquisition of an additional rule.

First, as preparation of the acquisition of the additional rule, various example sentences before and after replacement are stored in a database or the like. An additional rule generator searches the example sentences stored in the database or the like for words having modification relations with the difference ("cut" (KIRU) and "turn" (MAWASU)), acquires appearance frequencies of the words having the modification relations with the difference, and causes the appearance frequencies to be separately stored in the database. The number of example sentences may be gradually increased by causing a machine translation apparatus according to the present embodiment to translate the sentences and sequentially store the translated sentences. In this method, various example sentences may be accumulated and used to set an appropriate additional rule. In addition, example sentences before replacement and example sentences after the replacement may be separately stored.

FIG. 5A illustrates an example of a target language modification database before replacement. A target language modification database illustrated in FIG. 5A indicates that a frequency at which "steering wheel" that is a modifier serving as an object of the verb "cut" and having a relation with the verb "cut" included in the difference is 10. The unit of this value may be arbitrary as long as the value indicates the frequency. For example, the value may be the number of interested example sentences. The second record indicates that the frequency is 80 at which the verb "cut" included in the difference has a relation with "a little" as serving a modifier for expressing a relation of degree of the verb "cut". The third record indicates that the frequency is 3 at which the verb "cut" has a relation with "to the right" as serving a modifier for expressing a relation of direction of the verb "cut".

FIG. 5B illustrates an example of the target language modification database after the replacement.

The first record indicates that a frequency is 50 when the verb "turn" included in the difference has a relation with "steering wheel" which serves a modifier as an object of the verb "turn". The second record indicates that the frequency is 60 when the verb "turn" has a relation with "a little" as serving a modifier for expressing a relation of degree of the verb "turn". The third record indicates that the frequency is 70 at which the verb "turn" has a relation with "right" as serving a modifier for expressing a relation of direction of the verb "turn".

In the aforementioned description, the example sentences are stored in the database, the frequencies are sequentially acquired, and the target language modification database before and after the replacement is generated. Target language modification databases before and after the replacement may be generated directly for the various words in advance.

It is considered that a word of which a frequency is low before the replacement is a word inappropriate as the target language after the translation. Thus, whether or not the words are inappropriate ones is determined based on ratios of the frequencies before the replacement to the frequencies after the replacement.

In the examples illustrated in FIGS. 5A and 5B, the frequency ratio of the frequency "steering wheel" serving as the object is 10/50=0.2, the frequency ratio of "slightly" serving as the degree is 80/60=1.3, and the frequency ratio of "to the right" serving as the direction is 3/70=0.04. The frequency ratio of the direction is smallest. Thus, an additional rule is set for "to the right" that indicates the direction. Specifically, when "to the right" that is the modifier serving as the direction and having the relation with the verb "cut" included in the difference exists, "cut" is replaced with "turn".

When a plurality of ratios, each of which is a ratio of a frequency of word before the replacement to a frequency of a word after the replacement, are lower than a threshold, it may be preferable to set an additional rule in which the individual additional rules for corresponding words are set.

When the threshold is 0.3, the frequency ratio of "steering wheel" serving as the object is 10/50=0.2 and lower than the threshold, the frequency ratio of "slightly" serving as the degree is 80/60=1.3, and the frequency ratio of "to the right" serving as the direction is 3/70=0.04 and lower than the threshold. Thus, in addition to the rule for replacing "cut" with "turn" when the sentence includes "to the right" as the modifier having the relation with "cut" and serving as the direction of the verb "cut" included in the difference, a rule illustrated in FIG. 6, are added. The additional rule illustrated in FIG. 6 is a rule for replacing "cut" with "turn" when the sentence includes "steering wheel" as the modifier having the relation with "cut" and serving as the object of the verb "cut" included in the difference.

Figure 7A:
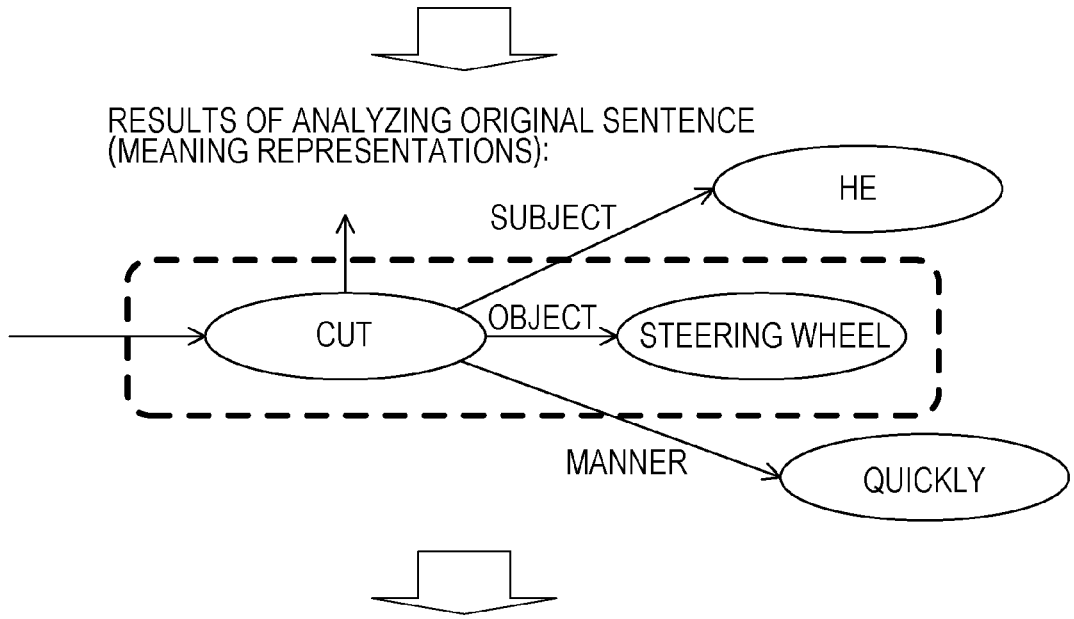
FIGS. 7A and 7B are diagrams describing the outline of the embodiments.
Figure 7B:
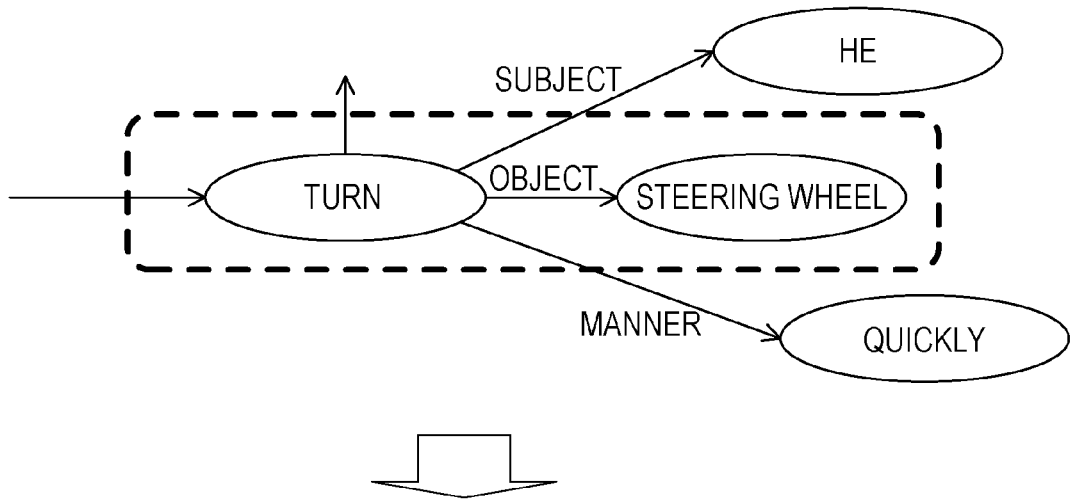

FIGS. 7A and 7B illustrate an example in which after the addition of the aforementioned additional rules, translation from Japanese to English is executed.

It is assumed that a sentence "KARE WA HANDORU WO SUBAYAKU KIRU" is provided as an input sentence. Results of analyzing the original sentence that are meaning representations are illustrated in FIG. 7A. In the example, "he" is detected as a subject, "steering wheel" is detected as an object, and "quickly" is detected as a manner. In the example, "steering wheel" is detected as a modifier serving as the object of the verb "cut" and having a relation with the verb "cut". Thus, "cut" is replaced with "turn" in accordance with the aforementioned additional rule in meaning representation conversion. A sentence translated from Japanese to English and obtained as a result is a sentence "He turns the steering wheel quickly."

Figure 8:
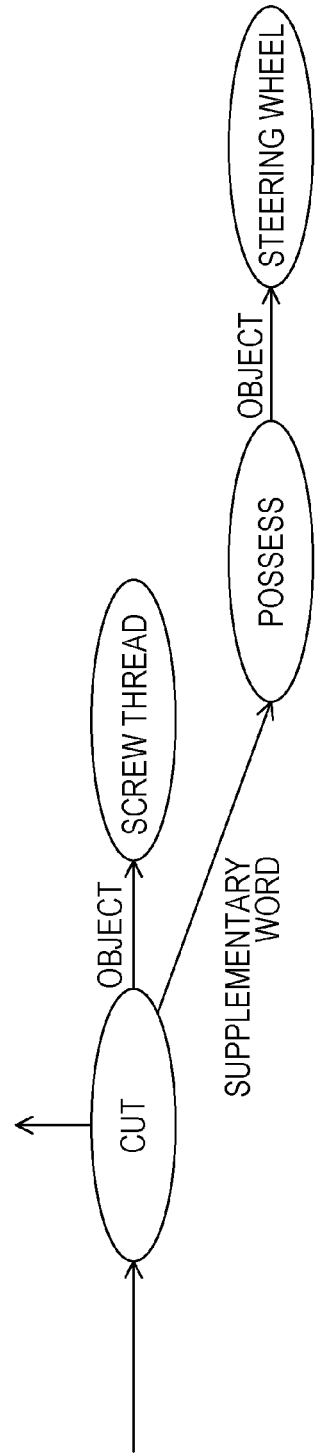
FIG. 8 is a diagram describing the outline of the embodiments.

FIG. 8 illustrates another example of the translation from Japanese to English.

When the input sentence is "HANDORU WO MOTTE NEJIYAMA WO KITTE KUDASAI", meaning representations that are results of analyzing the original sentence are illustrated in FIG. 8. Specifically, "screw thread" is detected as an object of the verb "cut", "possess" is detected as a supplementary word for the verb "cut", and "steering wheel" is detected as an object of the supplementary word. Since "to the right" that indicates a direction as words modifying the verb "cut" and has a relation with "cut", and "steering wheel" that is an object and has a relation with the verb "cut", do not exist, the sentence does not include any word that is subjected to replacement to be executed using the replacement rules. Thus, the verb "cut" is maintained without being replaced, and a sentence translated from Japanese to English and obtained is a sentence "Please cut the screw thread with the steering wheel."

Figure 9:
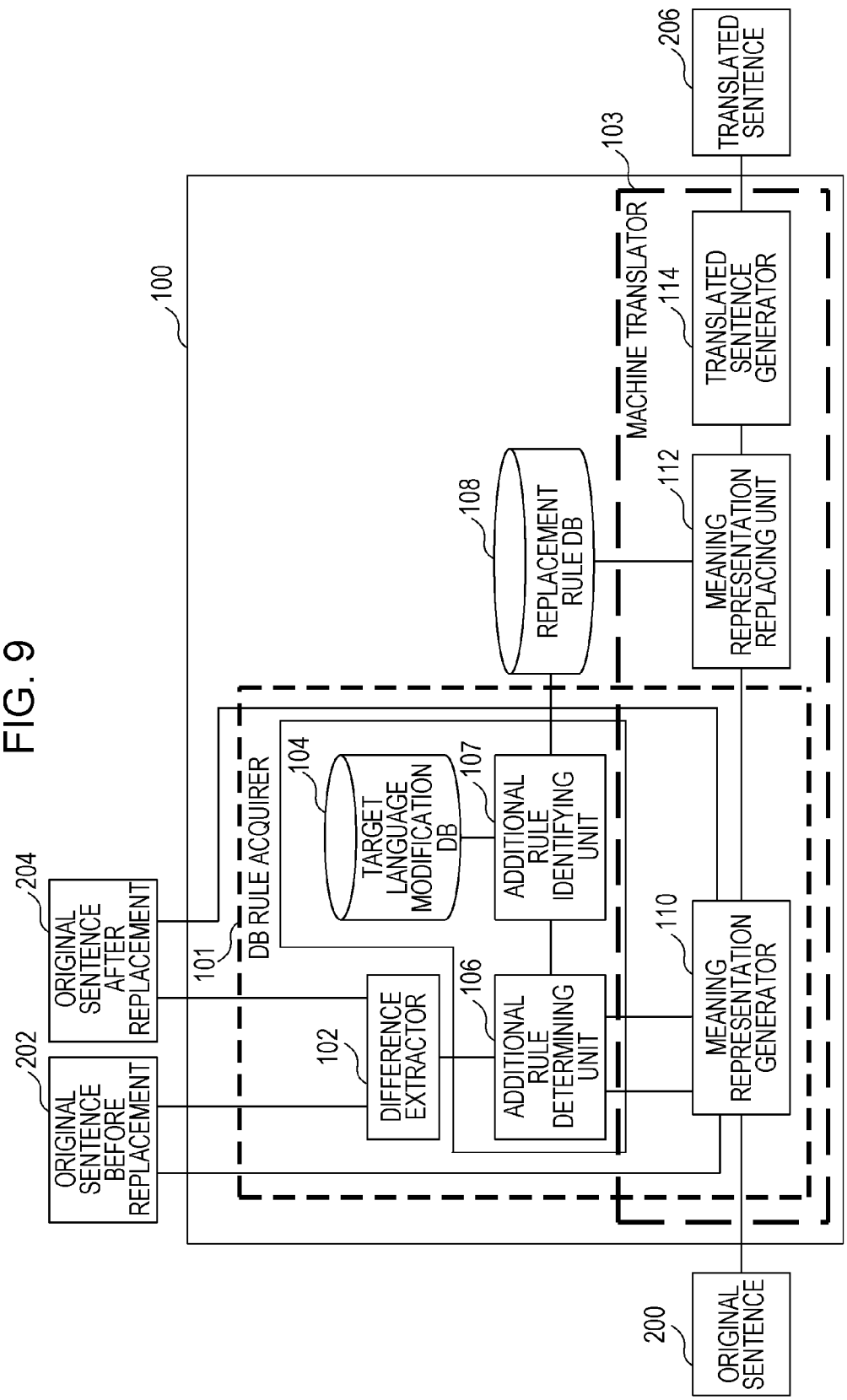
FIG. 9 is a diagram illustrating a configuration according to a first embodiment.

FIG. 9 is a block configuration diagram illustrating the machine translation apparatus according to the present embodiment.

The machine translation apparatus 100 is connected to a database storing, as example sentences, an original sentence before replacement 202 and an original sentence after replacement 204. A DB rule acquirer 101 reads the original sentence before replacement 202 and the original sentence after replacement 204 to acquire an additional rule. First, a difference detector 102 detects a difference between the original sentence before replacement 202 and the original sentence after replacement 204. The detected difference and sentence structures of the original sentence before replacement 202 and the original sentence after replacement 204 from a meaning representation generator 110 are input to an additional rule determining unit 106, and then the additional rule determining unit 106 determines whether or not an additional rule is to be set. When the additional rule determining unit 106 determines that the additional rule is to be set, data of the difference and information representing that the additional rule is to be set are input to an additional rule identifying unit 107. The additional rule identifying unit 107 references the aforementioned target language modification database (DB) 104, determines the additional rule, and registers the additional rule in a replacement rule database (DB) 108.

The original sentence 200 to be translated is input to the meaning representation generator 110 included in a machine translator 103. The meaning representation generator 110 replaces the original sentence 200 with words of a target language, analyzes a structure of the sentence on a word basis, and detects the original sentence as nodes such as a verb and words modifying the verb. When the meaning representation generator 110 obtains meaning representations, the meaning representations of the original sentence 200 are input to a meaning representation replacing unit 112. The meaning representation replacing unit 112 references the replacement rule DB 108 and replaces a part of words of the original sentence. Then, a translated sentence generator 114 generates a translated sentence 206 and outputs the translated sentence 206.

Operations of the machine translation apparatus according to the present embodiment are described with reference to FIGS. 10A to 14.

First, a replacement rule is acquired. When the original sentence before the replacement is a sentence "HANDORU WO SUKOSHI MIGINI KITTE KUDASAI", and the original sentence after the replacement is a sentence "HANDORU WO SUKOSHI MIGINI MAWASHITE KUDASAI", the machine translation apparatus according to the present embodiment analyzes the original sentences before and after the replacement and obtains meaning representations illustrated in FIGS. 10A and 10B.

FIG. 10A illustrates the meaning representations of the original sentence before the replacement, while FIG. 10B illustrates the meaning representations of the original sentence after the replacement. A difference between the meaning representations of the original sentence before the replacement and the meaning representations of the original sentence after the replacement is "cut" 300 and "turn" 400. Modifiers as objects are "steering wheel" 302, 402, while modifiers as directions are "to the right" 304, 404. Modifiers as degrees are "slightly" 306, 406.

Next, the additional rule determining unit 106 determines the validity of a range, corresponding to the difference between the original sentences, of the meaning representations. In an example illustrated in FIG. 11, the difference between the original sentences is only "cut" and "turn". When a rule for a requirement of replacing all words "cut" with "turn" is added, the rule may be excessively used and a result of the translation may be deteriorated. Thus, avoiding excessively use of the rule, the addition of a requirement is permitted when a number of nodes that are included in a difference between original sentences before and after replacement do not exist (or when the number of the nodes is equal to or larger than a threshold) are more than a certain number. For example, when the number of the nodes that are included in the difference is equal to or larger than 2 (that is the threshold), an additional rule is set, nodes that are adjacent to the nodes are added to the rule, a rule for replacing "cut" with "turn" when the original sentence includes "WO KIRU", "DE KIRU", or the like is applied, or the like.

FIGS. 12A to 12D are diagrams describing a process to be executed by the additional rule identifying unit 107.

The additional rule identifying unit 107 uses the target language modification database 104 to select, from among words having modification relations with the nodes included in the difference, words to be included in the additional rule.

Figure 12A:
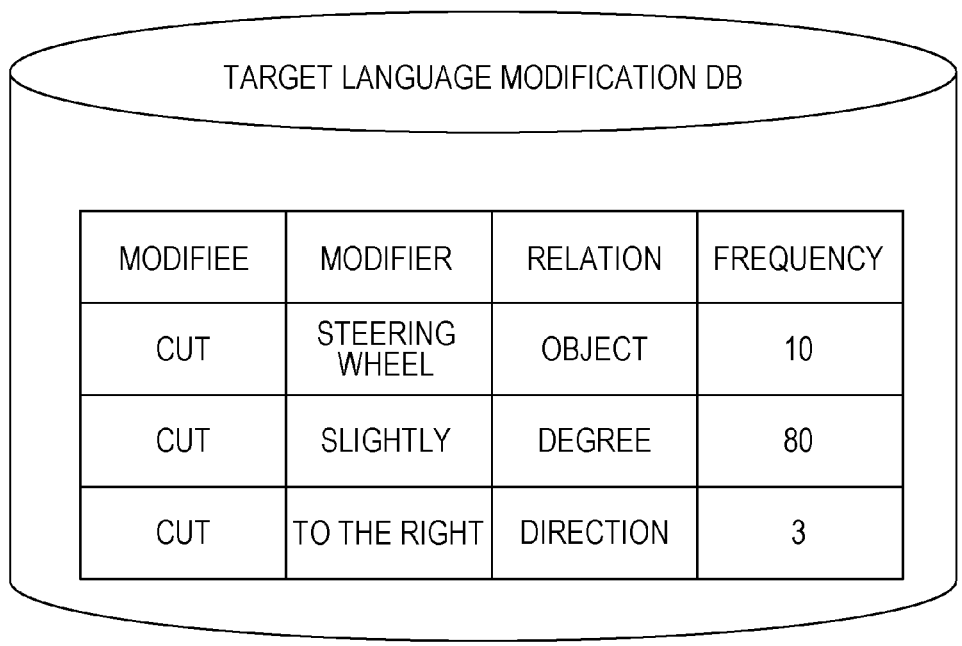
FIG. 12A is a diagram describing a process to be executed by an additional rule identifying unit.
Figure 12B:
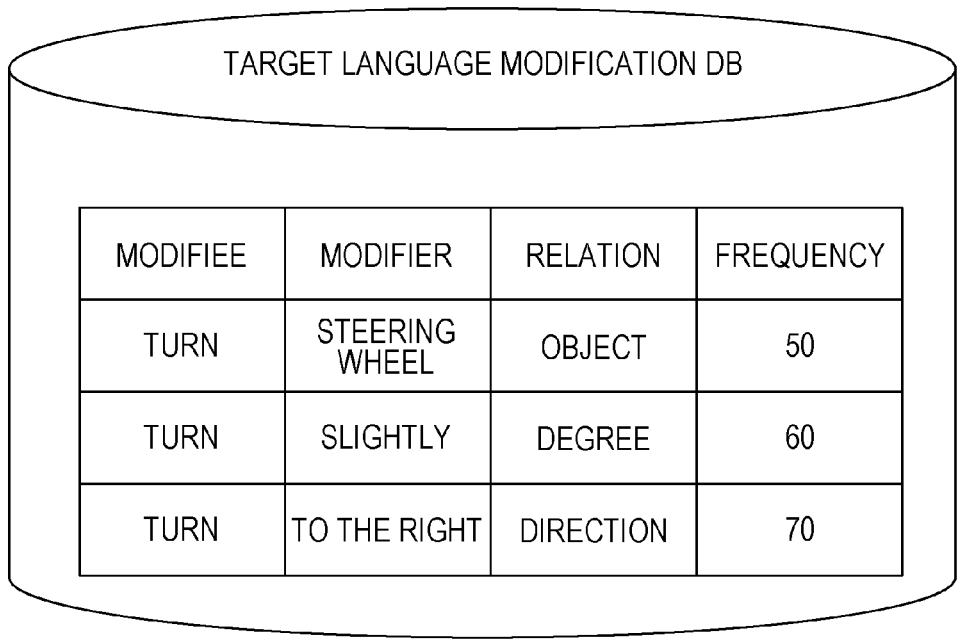
FIG. 12B is a diagram describing the process to be executed by the additional rule identifying unit.

FIG. 12A illustrates an example of the target language modification database 104 before replacement, while FIG. 12B illustrates an example of the target language modification database 104 after the replacement. The ratios of the frequencies of the words, such as "steering wheel", "a little, or "right" in FIG. 12A, included in the sentence before the replacement and having modification relations with the word, such as "cut" in FIG. 12A, included in the difference to the frequencies of the words, such as "steering wheel", "a little, or "right" in FIG. 12B, included in the sentence after the replacement and having modification relations with the word, such as "turn" in FIG. 12B, included in the difference are calculated. As is apparent from FIGS. 12A and 12B, a frequency of a combination of "cut" and "to the right" before the replacement is smallest. In addition, it is understood that a ratio of the frequency of the combination of "cut" and "to the right" to a frequency of a combination of "turn" and "to the right" is smallest. This is considered to indicate that the combination of "cut" and "to the right" is unnatural. Thus, "to the right" is selected as a word to be included in the additional rule.

Figure 12C:
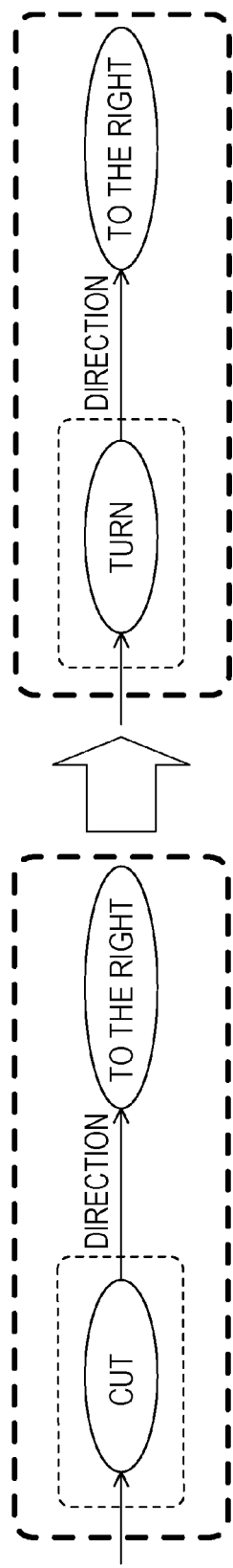
FIG. 12C is a diagram describing the process to be executed by the additional rule identifying unit.

Specifically, as illustrated in FIG. 12C, when "to the right" exists as the modifier representing the direction of the verb "cut" before the replacement, a process of replacing "cut" with "turn" is executed.

In addition, when ratios of frequencies of words before replacement to frequencies of the words after the replacement are lower than the threshold, the words may be separately, additionally set to be included in the additional rule. For example, when the threshold is 0.3, the ratio of the frequency of "steering wheel" before the replacement to the frequency of "steering wheel" after the replacement is 10/50=0.2 and lower than the threshold, the ratio of the frequency of "slightly" before the replacement to the frequency of "slightly" after the replacement is 80/60=1.3, and the ratio of the frequency of "to the right" before the replacement to the frequency of "to the right" after the replacement is 3/70=0.04 and lower than the threshold. In this case, in addition to "to the right", "steering wheel" is selected as word to be included in the additional rule.

Figure 12D:
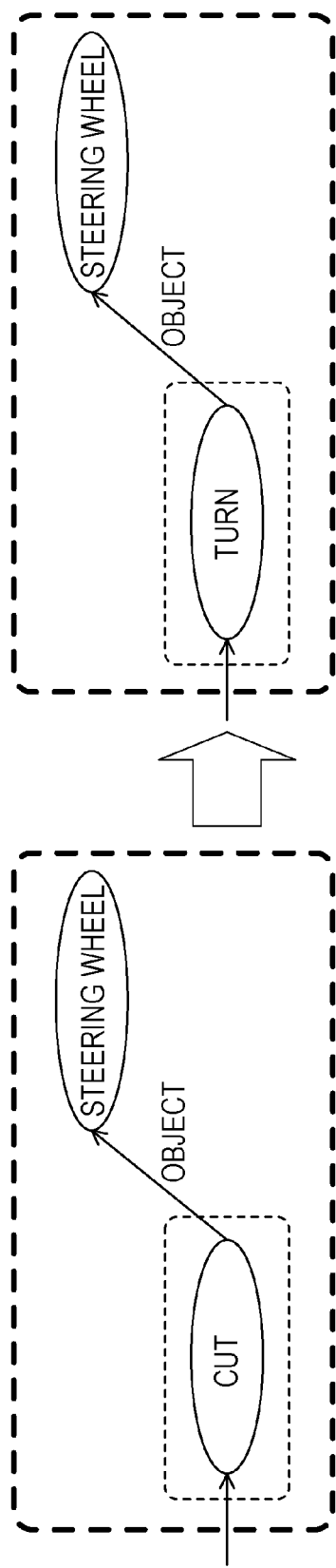
FIG. 12D is a diagram describing the process to be executed by the additional rule identifying unit.

In this case, as illustrated in FIG. 12D, when "steering wheel" exists as the modifier representing the object of the verb "cut" before the replacement, the process of replacing "cut" with "turn" is executed.

The threshold is 0.3, but may be arbitrarily determined based on experiments and experience by a person who designs or manufactures the machine translation apparatus 100 according to the present embodiment.

Figure 13:
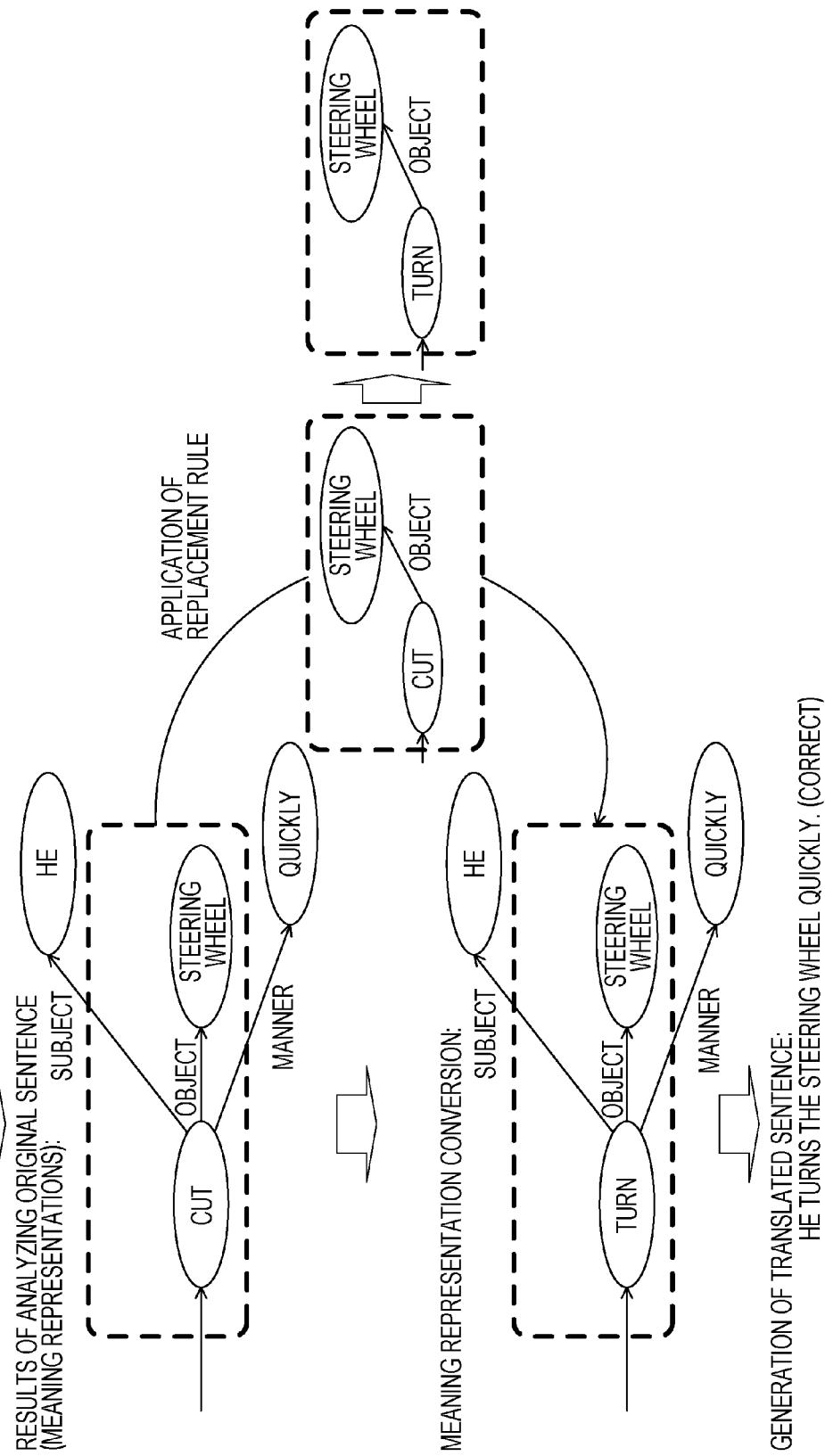
FIG. 13 is a diagram illustrating an example in which a result of translation executed using a replacement rule is correct.

FIGS. 13 and 14 are diagrams describing translation operations.

FIG. 13 assumes that when a sentence "KARE WA HANDORU WO SUBAYAKU KIRU" is provided as an input sentence, a sentence "He cuts steering wheel quickly" is obtained as an initial translated sentence. The obtained sentence is analyzed and meaning representations are obtained. Then, "he" that serves as a subject of the verb "cut" is obtained as a node, "steering wheel" that serves as an object of the verb "cut" is obtained as a node, and "quickly" that serves as a manner of the verb "cut" is obtained as a node.

Next, a replacement rule is applied. In the aforementioned case, an additional rule for executing the process of replacing "cut" with "turn" when "steering wheel" exists as a modifier representing the object of the verb "cut" before the replacement is applied. Thus, "turn" is used instead of "cut" as a result of the meaning representing conversion. Then, a translated sentence "He turns the steering wheel quickly." is generated using results of the meaning representation conversion.

FIG. 14 assumes that when a sentence "HANDORU WO MOTTE NEJIYAMA WO KITTE KUDASAI" is provided as an input sentence, a sentence "Please cut the screw thread with the steering wheel." is obtained as an initial translated sentence. The obtained sentence is analyzed and meaning representations are obtained. Then, "screw thread" is obtained as an object of the verb "cut", "possess" is obtained as a supplementary word of the verb "cut", and "steering wheel" is obtained as an object of the supplementary word.

Next, a replacement rule is attempted to be applied. However, since a corresponding rule does not exist in this case, any word is not replaced in the meaning representation conversion. Thus, a translated sentence obtained as a result is a sentence "Please cut the screw thread with the steering wheel."

Figure 15:
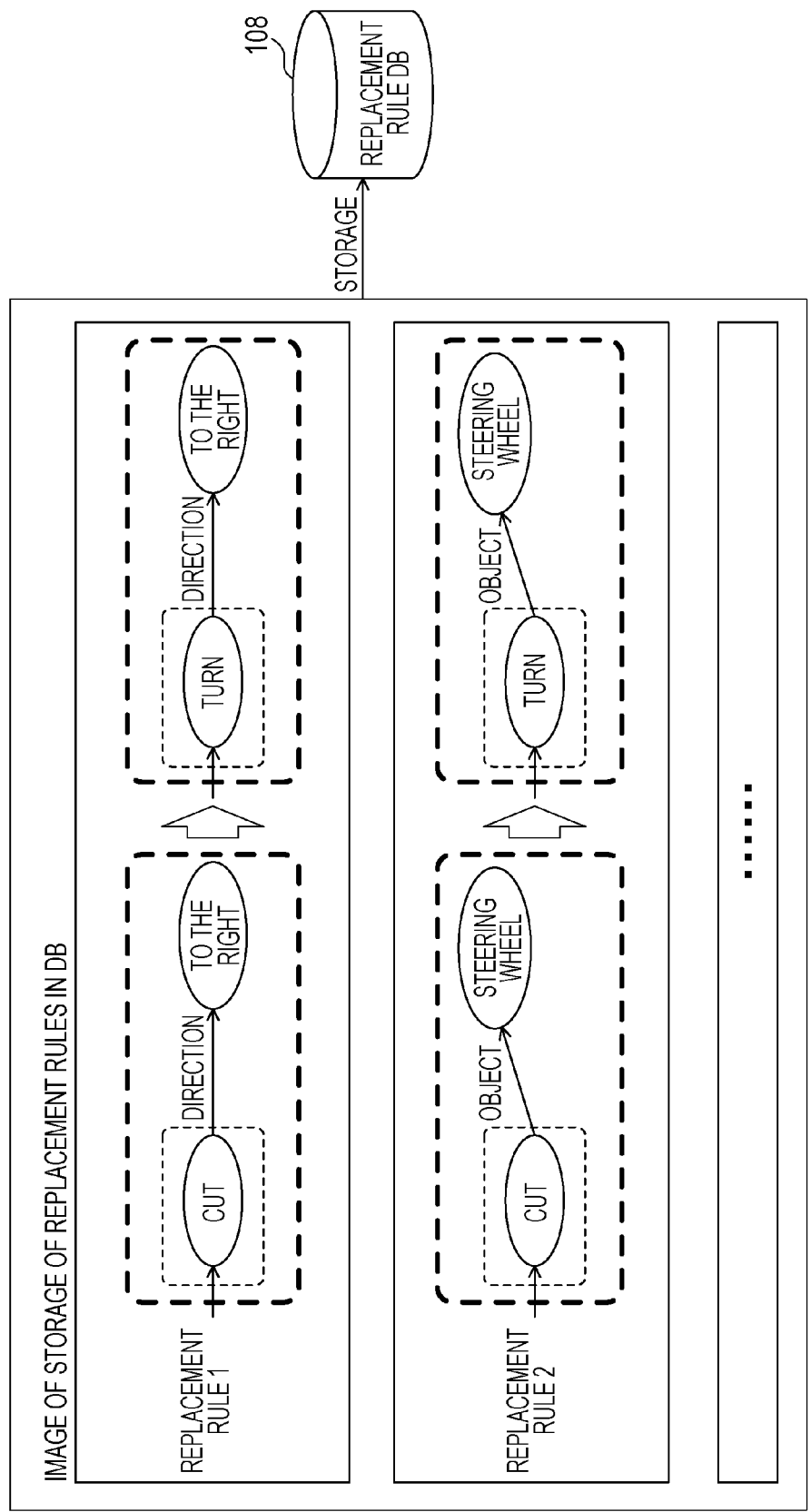
FIG. 15 is a diagram illustrating an image of storage of replacement rules in a DB.

FIGS. 15 and 16 are diagrams illustrating an example of data stored in the replacement rule database 108.

As indicated by a storage image in FIG. 15, data is stored in the replacement rule database (DB) 108 for each of replacement rules. Data that represents nodes before replacement, and data that represents nodes after the replacement, are stored for each of the replacement rules.

As indicated by a more specific image in FIG. 16, data of nodes is stored as tuples for each of the replacement rules. Each of the tuples is a combination of three items, a "FROM node", an "arc", and a "TO node", which represent a single edge (connection formed between nodes) included in meaning representations. The overall meaning representations may be expressed by a plurality of tuples. The arc indicates a semantic relationship between the FROM node and the TO node. For example, "to the right" is the modifier of the verb "cut" and indicates the direction, and an arc is the "direction".

FIG. 16 exemplifies replacement rules of which record numbers are 1 and 2. In an initial record of a record with the record number 1, the number of tuples stored is described. In addition, in the record with the record number 1, nodes before replacement and nodes after the replacement are described. Each tuple is composed of a "FROM node", an "arc", and a "TO node". Data of the nodes before the replacement is stored as a tuple [0], while data of the nodes after the replacement is stored as a tuple [1]. Since the tuples [0] and [1] belong the single replacement rule, the record number is 1. Values of the tuple [0] that is the data of the nodes before the replacement are (cut, direction, right), while values of the tuple [1] that is the data of the nodes after the replacement are (turn, direction, right).

The other replacement rule is described in a record with the record number 2. In the record with the record number 2, the number of tuples, data of nodes before replacement, and data of nodes after the replacement are described in the same manner as the record with the record number 1. In the record with the record number 2, values of a tuple [2] before the replacement are (cut, object, steering wheel), and values of a tuple [3] after the replacement are (turn, object, steering wheel).

Figure 17:
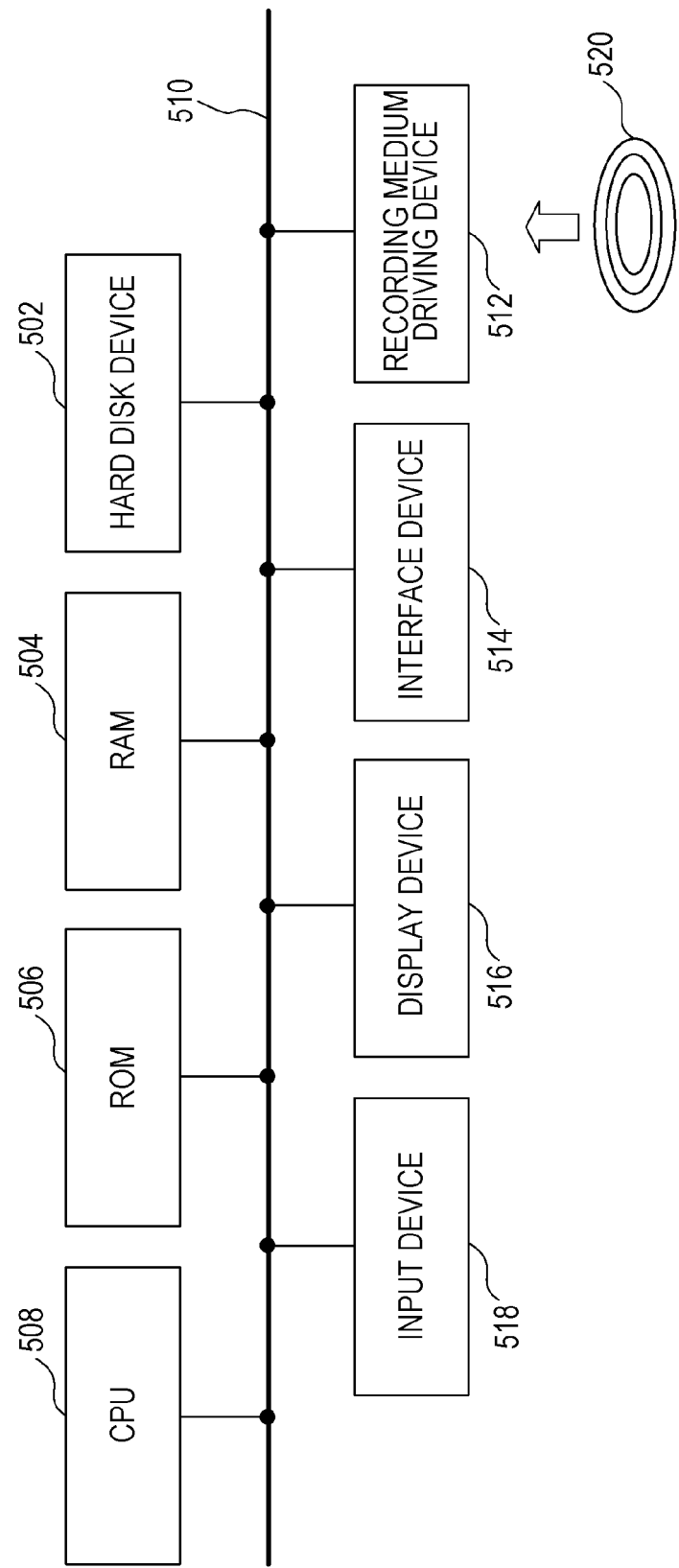
FIG. 17 is a block diagram illustrating an example of a hardware configuration of a standard computer.

FIG. 17 is a diagram illustrating a hardware environment that enables a computer to achieve the machine translation apparatus according to the present embodiment.

The computer 500 that achieves the machine translation apparatus according to the present embodiment is controlled by a CPU 508. The CPU 508 is coupled through a bus 510 to a ROM 506, a RAM 504, a hard disk device 502, an input device 518, a display device 516, an interface device 514, and a recording medium driving device 512.

The ROM 506 stores a basic program that is a BIOS or the like and is executed in order to operate the computer 500. The CPU 508 enables input and output of the computer 500 and the like by executing the basic program.

A program for executing the machine translation apparatus according to the present embodiment and the like are loaded into the RAM 504, and the CPU 508 executes the program.

The hard disk device 502 stores the program to be loaded into the RAM 504, data to be used to execute the program, and the like. The hard disk device 502 may store the program for executing machine translation according to the present embodiment. The hard disk device 502 may include the target language modification DB and the replacement rule DB.

The input device 518 is a keyboard, a mouse, or the like and is used to input information to the computer 500 from a user. When the machine translation apparatus according to the present embodiment is achieved by the computer 500, the user uses the input device 518 to input a sentence to be translated to the computer 500.

The display device 516 is a CRT, a liquid crystal display, or the like and used to present, to the user, information input from the input device 518, a translated sentence that is a result of calculation executed by the CPU 508, and the like.

The recording medium driving device 512 reads data from a portable recording medium 520 such as a CD, a DVD, a Blu-ray (registered trademark) disc, a flexible disk, or an IC memory and causes data to be stored in the portable recording medium 520. The portable recording medium 520 stores the program to be loaded into the RAM 504, the data to be used to execute the program, and the like, similarly to the hard disk drive 502.

The interface device 514 couples the computer 500 to another computer through a network (not illustrated). For example, the user may use a target language modification DB built in the other computer and a replacement rule DB built in the other computer to cause the computer 500 to execute the machine translation program according to the present embodiment. In addition, the computer 500 may execute a translation process so as to translate a sentence input from the other computer.

FIGS. 18 to 21 are flowcharts describing operations according to the first embodiment.

Figure 18:
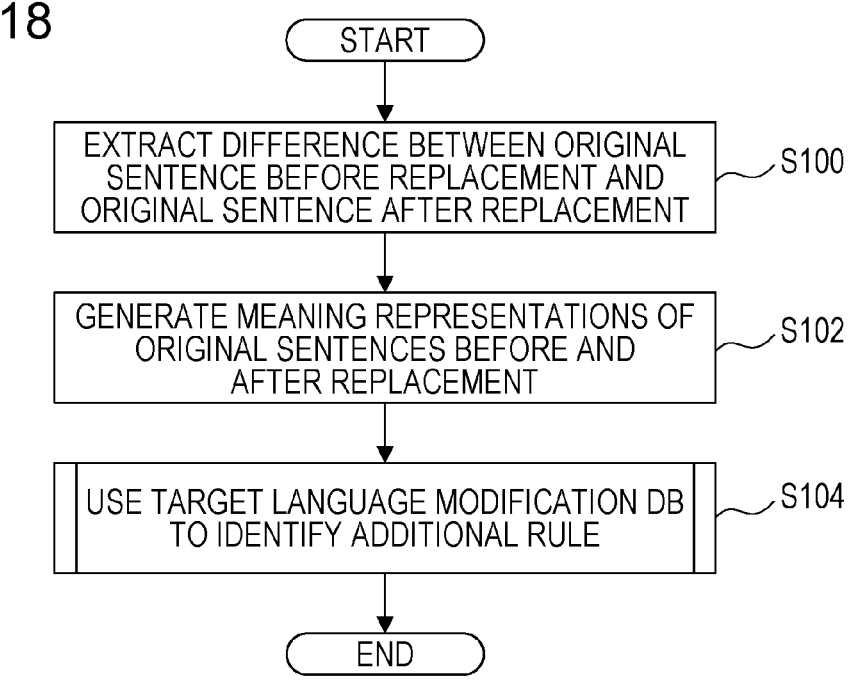
FIG. 18 is a flowchart according to the first embodiment.
Figure 19:
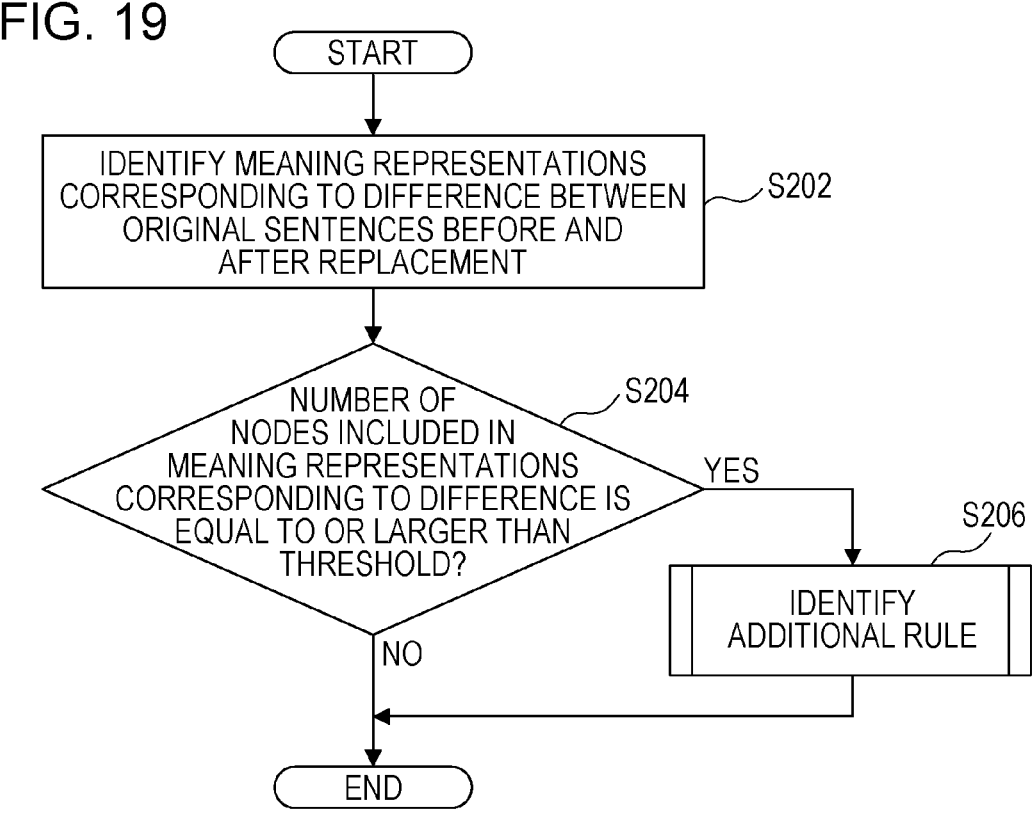
FIG. 19 is a flowchart according to the first embodiment.
Figure 20:
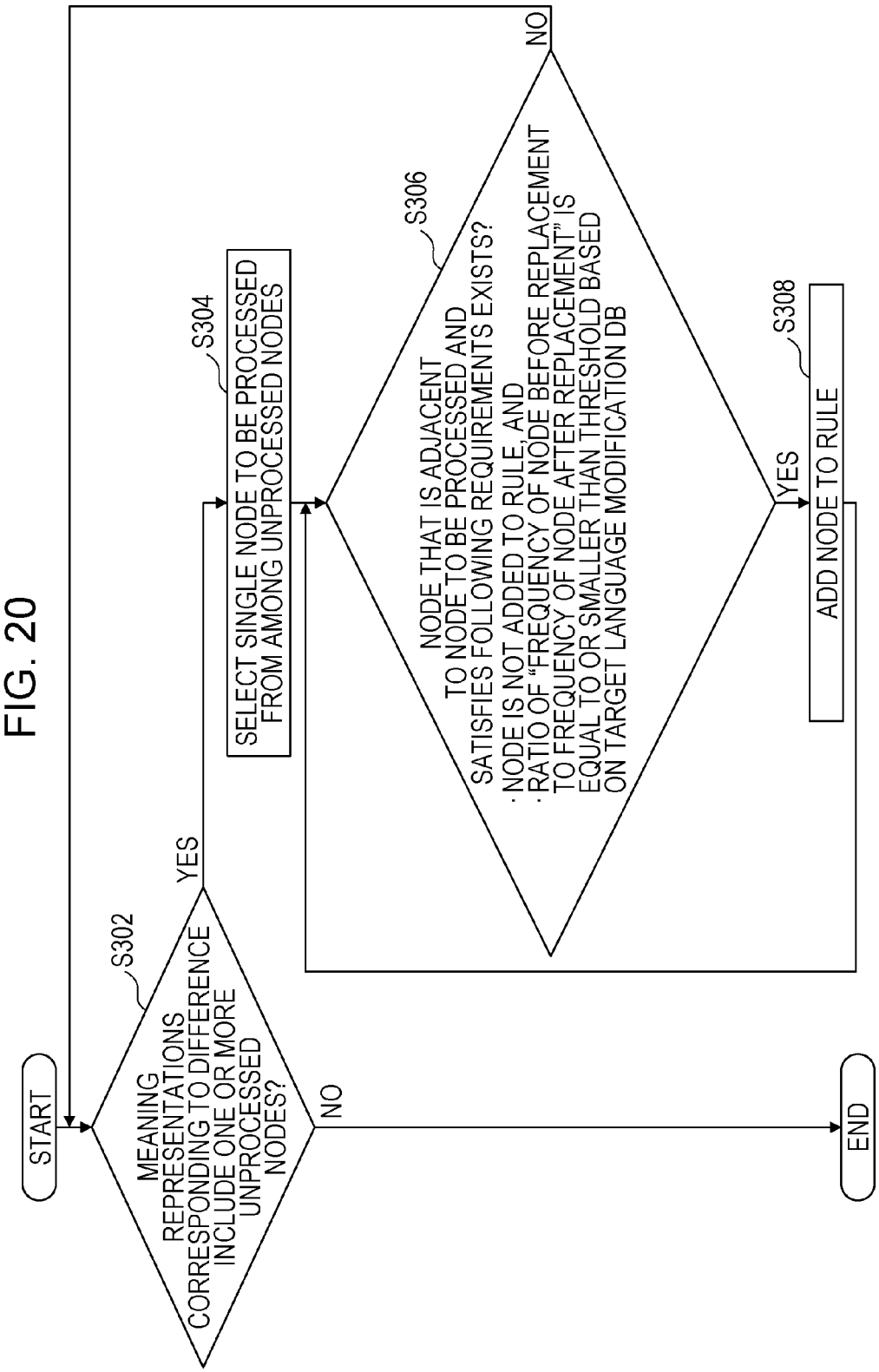
FIG. 20 is a flowchart according to the first embodiment.

FIGS. 18 to 20 are flowcharts of a process of acquiring a replacement rule.

Referring to FIG. 18, when the process starts, the DB rule acquirer 101 extracts a difference between an original sentence before replacement and an original sentence after the replacement in step S100. Next, in step S102, the DB rule acquirer 101 generates meaning representations of the original sentences before and after the replacement. Then, in step S104, the DB rule acquirer 101 references the target language modification DB 104 and identifies an additional rule in step S104 and terminates the process.

FIG. 19 is a flowchart of a subroutine process of step S104 illustrated in FIG. 18.

In step S202, the DB rule acquirer 101 identifies meaning representations corresponding to the difference between the original sentence before the replacement and the original sentence after the replacement. In step S204, the DB rule acquirer 101 determines whether or not the number of nodes included in the meaning representations corresponding to the difference is equal to or larger than the threshold. The aforementioned example describes the case where the threshold is 2. When the DB rule acquirer 101 determines that the number of the nodes is smaller than the threshold (No in step S204), the DB rule acquirer 101 terminates the process. When the DB rule acquirer 101 determines that the number of the nodes is equal to or larger than the threshold (Yes in step S204), the DB rule acquirer 101 identifies the additional rule in step S206 and terminates the process.

FIG. 20 is a flowchart of a subroutine process of step S206 illustrated in FIG. 19.

In step S302, the DB rule acquirer 101 determines whether or not one or more unprocessed nodes are included in the meaning representations corresponding to the difference. When the DB rule acquirer 101 determines that an unprocessed node is not included in the meaning representations corresponding to the difference (No in step S302), the DB rule acquirer 101 terminates the process. When the DB rule acquirer 101 determines that one or more unprocessed nodes are included in the meaning representations corresponding to the difference (Yes in step S302), the DB rule acquirer 101 selects one node to be processed from among the unprocessed nodes in step S304. In step S306, the DB rule acquirer 101 determines whether or not a node that satisfies the following requirements exists among nodes adjacent to the node to be processed. The requirements are that the node is not added to the replacement rule and that a ratio of "a frequency of the node before the replacement to a frequency of the node after the replacement" is equal to or smaller than the threshold based on the target language modification DB 104.

When the DB rule acquirer 101 determines that the node that satisfies the aforementioned requirements does not exist (No in step S306), the DB rule acquirer 101 causes the process to return to step S302 and repeats the process. When the DB rule acquirer 101 determines that the node that satisfies the aforementioned requirements exists (Yes in step S306), the DB rule acquirer 101 adds the node to the replacement rule in step S308, causes the process to return to step S306, and repeats the process.

Figure 21:
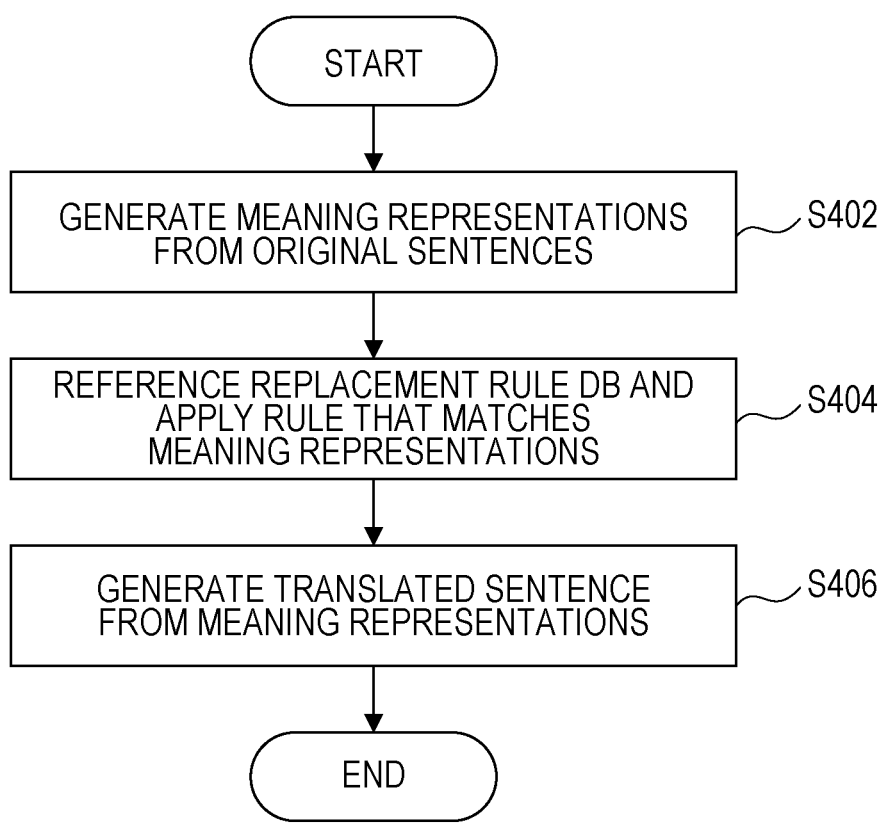
FIG. 21 is a flowchart according to the first embodiment.

FIG. 21 is a flowchart of the translation process to be executed by the machine translator 103. When an original sentence 200 to be translated is input, the machine translator 103 generates meaning representations from the original sentence. In step S404, the machine translator 103 references the replacement rule DB 108 and applies a replacement rule that matches the meaning representations. In step S406, the machine translator 103 generates a translated sentence from the meaning representations, outputs the translated sentence 206, and terminates the process.

Figure 22:
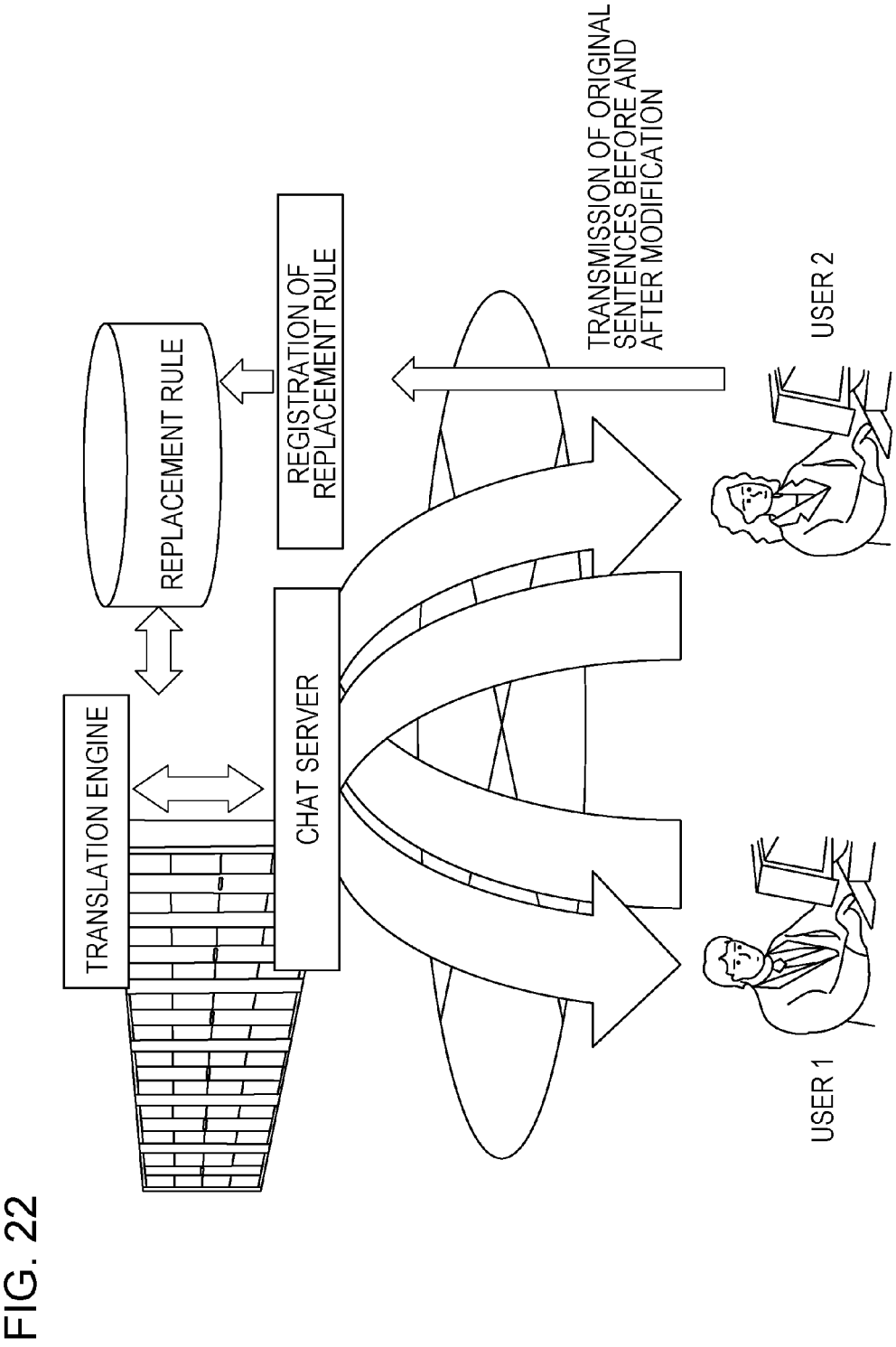
FIG. 22 is a diagram describing a configuration according to a second embodiment.
Figure 23:
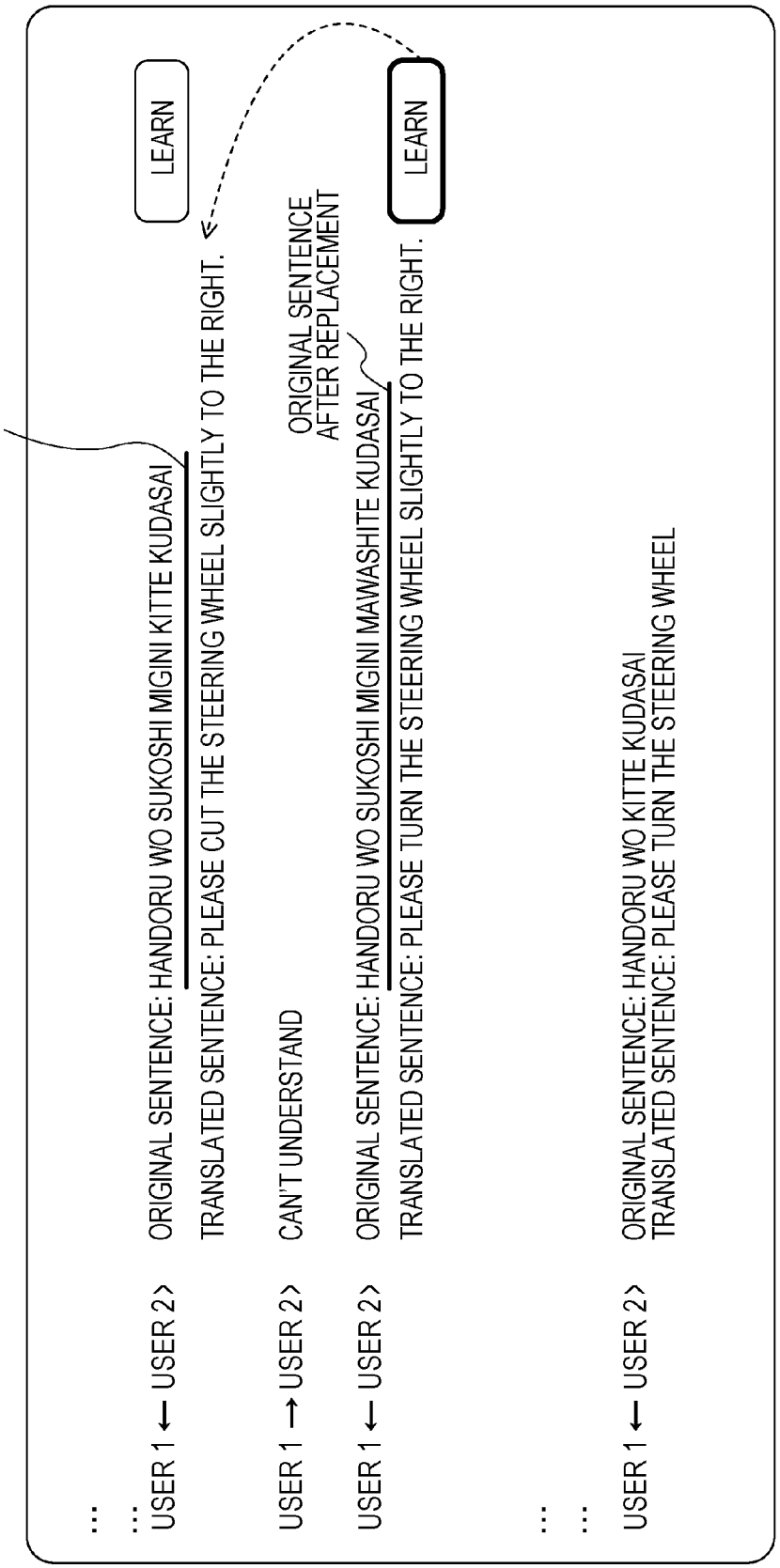
FIG. 23 is a diagram describing operations according to the second embodiment.
Figures 24, 25:
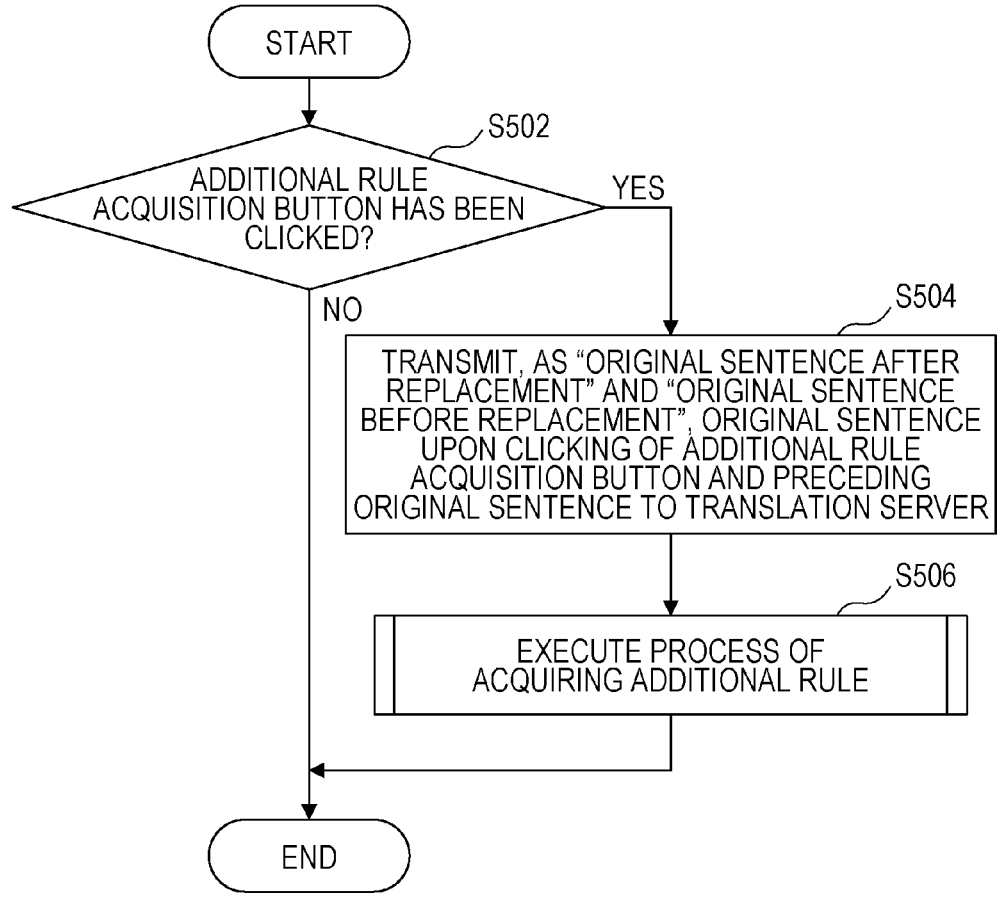
FIG. 24 is a flowchart according to the second embodiment.
FIG. 25 is a diagram describing operations according to a third embodiment.

FIGS. 22 to 24 are diagrams describing a second embodiment.

Referring to FIG. 22, there is a case where when a certain person uses the machine translation to chat with a foreign person, the foreign person does not understand a sentence and asks the meaning of the sentence, and the certain person replaces the original transmitted sentence with a sentence including other representations, the foreign person understands the sentence. In this case, it is considered that a replacement rule is acquired based on the sentences before and after the replacement.

The case illustrated in FIG. 22 assumes that a user 2 is the certain person and a user 1 is the foreign person. The users 1 and 2 chat with each other using a chat server. Languages of the users 1 and 2 are different. Thus, the users 1 and 2 chat with each other while a translation engine translates sentences from the language of the user 1 to the language of the user 2 and vice versa. Then, when any of the users 1 and 2 receives information representing that the other user does not understand the meaning of a sentence in the chat, the receiving user modifies the sentence and transmits the modified sentence to the other user. Thus, when the other user understands the sentence in the chat, the original sentences before and after the modification are transmitted to the machine translation apparatus according to the present embodiment in order to register a new replacement rule. The machine translation apparatus uses the aforementioned method to generate the new replacement rule from the transmitted original sentences before and after the modification and stores the new replacement rule. After that, in the chat using the translation engine of the machine translation apparatus, the translation engine executes translation using the new replacement rule and thus may reduce a frequency at which the other user does not understand a sentence transmitted by the user in the chat.

FIG. 23 is an image diagram illustrating a terminal screen for the chat using the machine translation.

It is assumed that when the user 2 transmits an original sentence "HANDORU WO SUKOSHI MIGINI KITTE KUDASAI", the translation engine translates the original sentence so as to generate a sentence "Please cut the steering wheel slightly to the right" and presents the generated sentence to the user 1. Since the translated sentence is incorrect, the user 1 transmits, to the user 2, a sentence "Can't understand" or information that represents that the user 1 does not understand the meaning of the translated sentence in the chat. It is assumed that the user 2 modifies the original sentence before the replacement and inputs the original sentence after the replacement or the sentence "HANDORU WO SUKOSHI MIGINI MAWASHITE KUDASAI". The translation engine translates the input sentence and presents, to the user 1, a sentence "Please turn the steering wheel slightly to the right."

When the user 1 understands the meaning of the sentence in the chat, the user 2 presses (clicks) an "additional rule acquisition" button displayed side by side with the original sentence after the replacement. Then, an original sentence that precedes the original sentence after the replacement is acquired as the original sentence before the replacement and transmitted to the machine translation apparatus. The machine translation apparatus generates a replacement rule from the transmitted original sentence before the replacement and the original sentence after the replacement, and the generated replacement rule is used for translation of sentences in subsequent chat. In the subsequent chat, when the user 2 presents, to the user 1, an original sentence "HANDORU WO KITTE KUDASAI", a translated sentence "Please turn the steering wheel" is presented to the user 1.

FIG. 24 is a flowchart of a rule acquisition process according to the second embodiment.

During the execution of chat, it is determined whether or not a user of the chat has clicked the additional rule acquisition button in step S502. When it is determined that the additional rule acquisition button has not been clicked (No in step S502), chat software terminates the process. When it is determined that the additional rule acquisition button has been clicked (Yes in step S502), the chat software transmits, to a translation server (or the machine translation apparatus according to the present embodiment), an original sentence corresponding to the pressed additional rule acquisition button and an original sentence preceding the original sentence corresponding to the pressed additional rule acquisition button as an "original sentence after replacement" and an "original sentence before the replacement" in step S504. In step S506, the translation server executes the process of acquiring an additional rule and terminates the process illustrated in FIG. 24. The additional rule acquisition process of step S506 is the same as the process illustrated in FIGS. 18 to 20.

Figure 26:
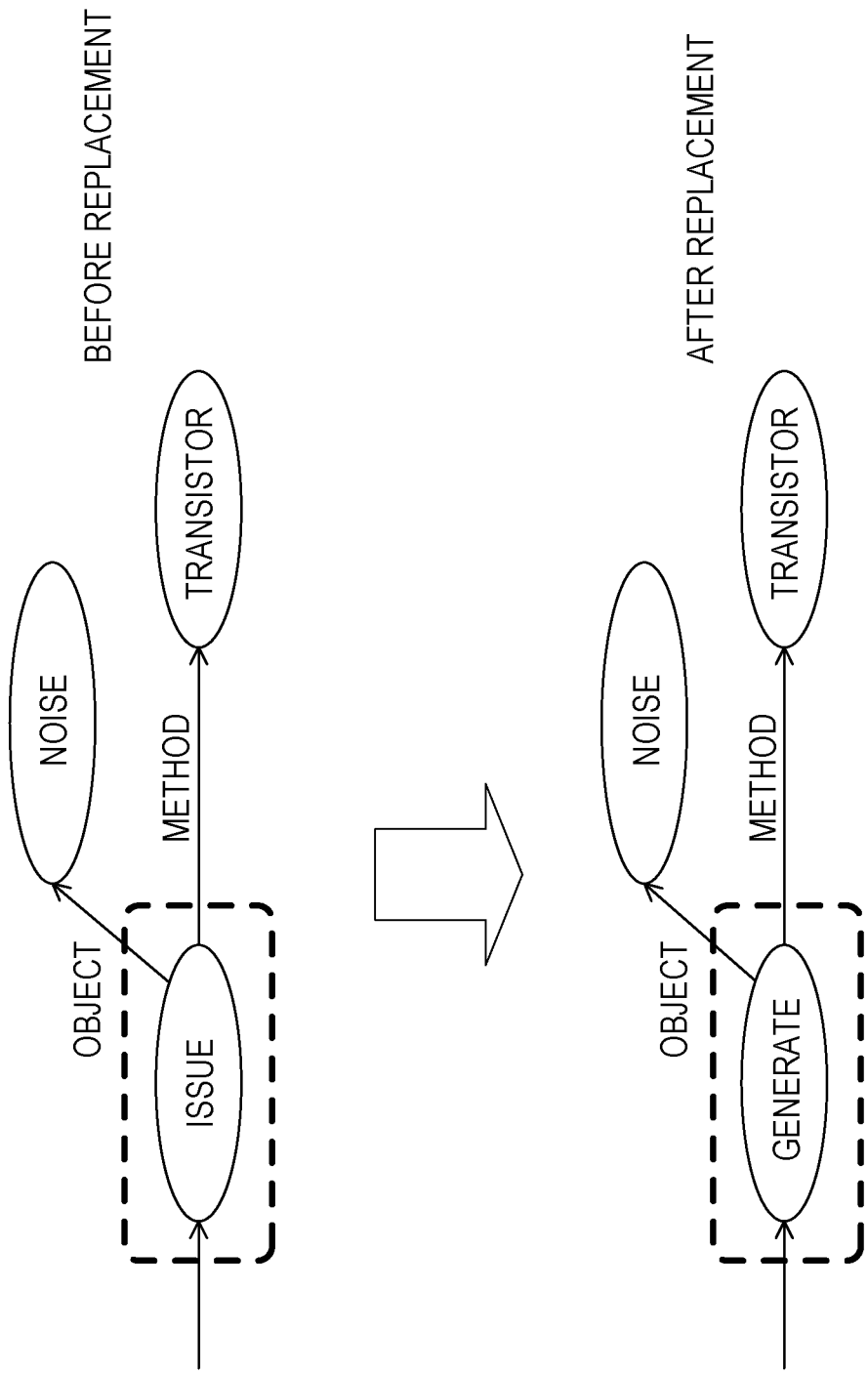
FIG. 26 is a diagram illustrating results of analyzing original sentences.
Figure 27:
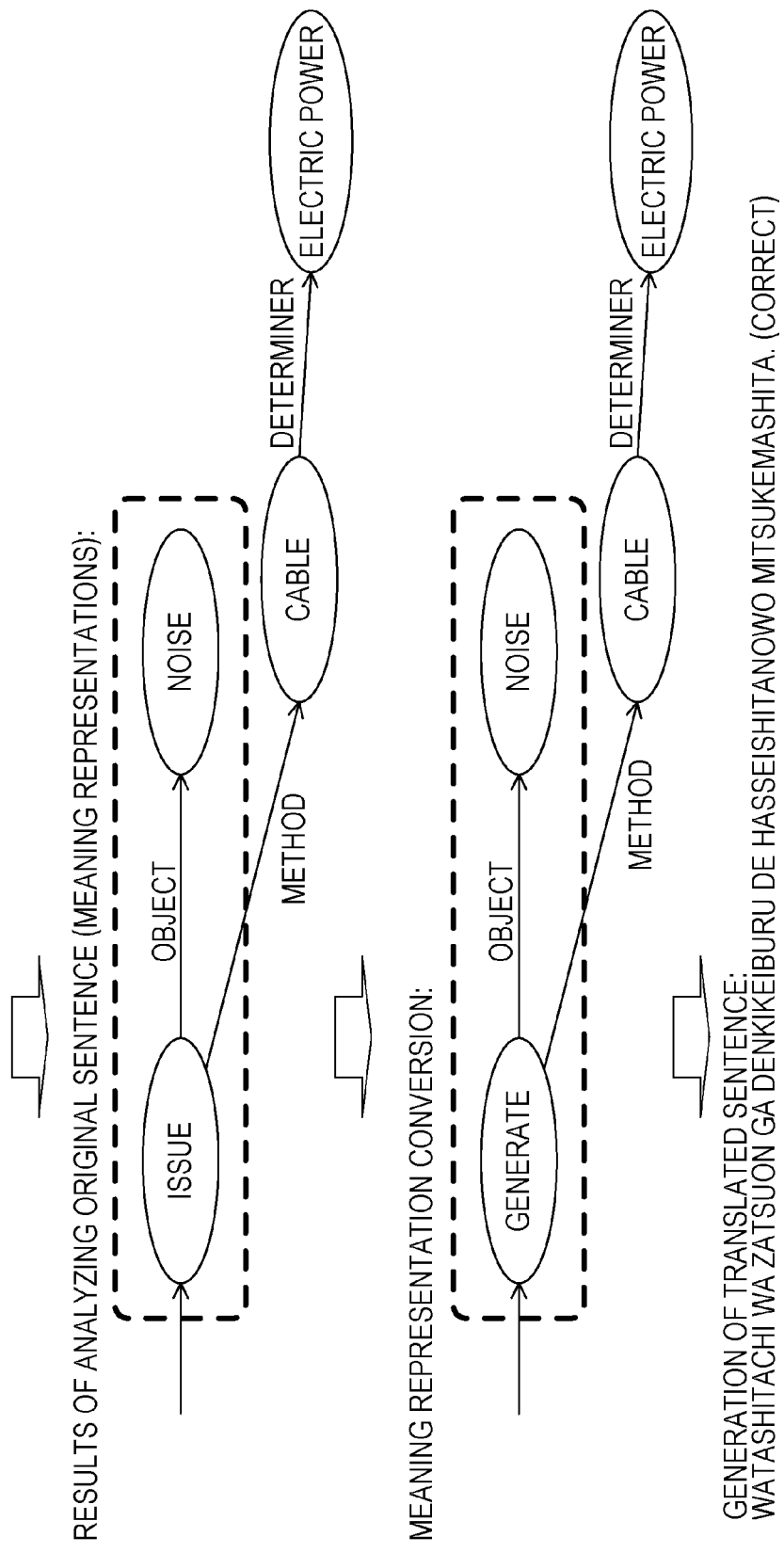
FIG. 27 is a diagram describing operations according to the third embodiment.

FIGS. 25 to 27 are diagrams describing a third embodiment.

The third embodiment describes a case where the machine translation apparatus according to the third embodiment is applied to English-to-Japanese translation.

As illustrated in FIG. 25, it is assumed that an original sentence before replacement is a sentence "The noise is issued by the transistor" and that an original sentence after the replacement is a sentence "The noise is generated by the transistor". Although a sentence translated in Japanese before replacement is a sentence "ZATSUON WA TORANJISUTA NIYOTTE HAKKOUSARERU" and incorrect, a sentence translated in Japanese after the replacement is a sentence "ZATSUON WA TORANJISUTA NIYOTTE HASSEISURU" and correct.

The machine translation apparatus analyzes the original sentences and obtains meaning representations. As illustrated in FIG. 26, "issue" that serves as a verb, "noise" that is a modifier serving as an object, and "transistor" that is a modifier serving as a method are obtained as nodes from the meaning representations of the original sentence before the replacement. In addition, "generate" that serves as a verb, "noise" that is a modifier serving as an object, and "transistor" that is a modifier serving as a method are obtained as nodes from the meaning representations of the original sentence after the replacement. The difference between the original sentences before and after the replacement is the verbs "issue" and "generate".

Next, a replacement rule is set. This example assumes that a rule for replacing "issue" with "generate" when a sentence includes "noise" as a modifier serving as an object is acquired.

As illustrated in FIG. 27, it is assumed that a sentence "We found out that the noise was issued by the power supply cable" is input as an input sentence. A sentence translated without the replacement rule is a sentence "WATASHI-TACHI WA ZATSUON GA DENKIKEIBURU NIYOTTE HAKKOUSARETANOWO MITSUKEMASHITA" and is not a correct Japanese sentence.

The machine translation apparatus analyzes the input original sentence and obtains meaning representations as a result of the analysis. In this case, "noise" that is a modifier serving as an object of the verb "issue", "cable" that is a modifier serving as a method, and "electric power" that serves as a determiner of "cable", are obtained as nodes for "issue" that serves as the verb.

The replacement rule is applied. In the aforementioned example, "noise" that is the modifier serving as the object of the verb "issue" exists, and thus the sentence matches the rule for replacing "issue" with "generate". Thus, the machine translation apparatus executes the meaning representation conversion so as to replace "issue" with "generate".

As a result of the aforementioned operation, a sentence "WATASHITACHI WA ZATSUON GA DENKIKEIBURU DE HASSEISHITANOWO MITSUKEMASHITA" is obtained as a sentence translated from English to Japanese and to be output.

Figure 28:
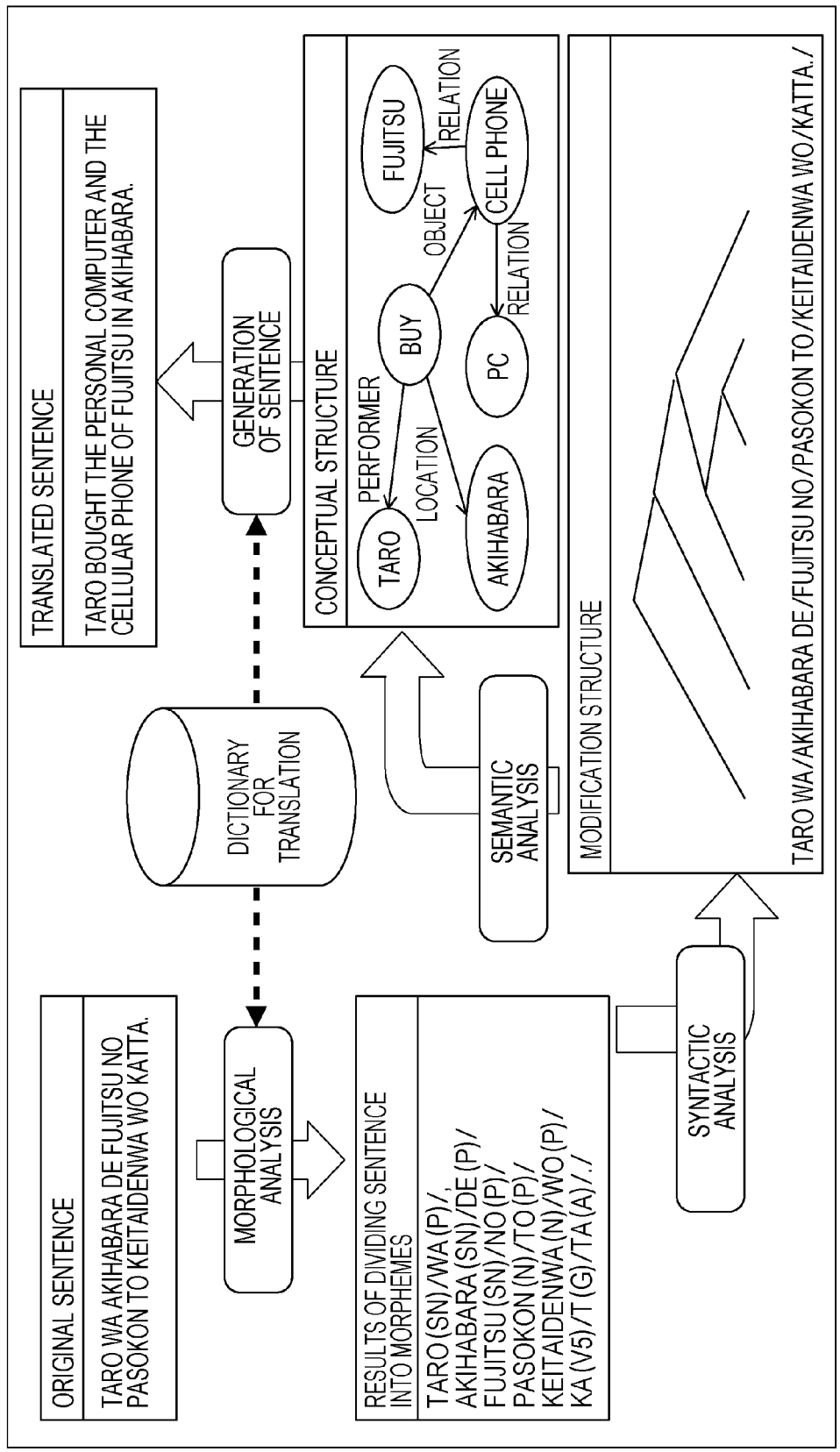
FIG. 28 is a diagram describing meaning representations.

FIG. 28 is a diagram describing a concept of the translation process using results of the syntactic and semantic analysis.

When receiving an original sentence "TARO WA AKI-HABARA DE FUJITSU NO PASOKON TO KEITAID-ENWA WO KATTA", the machine translation apparatus references a dictionary for translation and executes morphological analysis. Specifically, the machine translation apparatus divides the original sentence into morphemes "TARO", "AKIHABARA", "FUJITSU", "PASOKON", "KEITAIDENWA", "KA", "T", and "TA". After that, the machine translation apparatus executes the syntactic analysis and forms a modification structure. The machine translation apparatus executes the semantic analysis on the modification structure and builds a conceptual structure of the original sentence. In this case, it is understood that "buy" is a verb, "Taro" is a performer, "Akihabara" is a location, "cell phone" is an object of the verb, and "PC" and "Fujitsu" are objects related to "cell phone".

Then, the machine translation apparatus references the dictionary for translation, generates a sentence from the conceptual structure, and outputs the generated sentence as a translated sentence. The translated sentence is a sentence "Taro bought the personal computer and the cellular phone of Fujitsu in Akihabara".

According to the aforementioned configuration, a rule that avoids an incorrect translated sentence may be automatically set by using the database storing ratios of frequencies of words before replacement to frequencies of the words after the replacement. In addition, failed translated sentences and successful translated sentences are accumulated in a process in which when the meaning of a translated sentence is not appropriately conveyed in a chat translation system, a sender transmits another representation without changing the meaning. Thus, the chat translation system may achieve an autonomous growth type service.

Although the embodiments are described above, the techniques disclosed herein are not limited to the embodiments and may be variously changed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A machine translation apparatus comprising:
   a memory and;
   at least one processor coupled to the memory, the at least one processor configured to:
   obtain a first translated sentence generated by translating a first input sentence and a second translated sentence generated by translating a second input sentence, the second input sentence being a sentence into which the first input sentence is rewritten;
   acquire a difference between the first translated sentence and the second translated sentence;
   specify a first word in the first translated sentence corresponding to the difference, a second word in the second translated sentence corresponding to the difference and a related word that has a predetermined relationship with the first word and the second word, the related word being included in both of the first translated sentence and the second translated sentence;
   acquire a first appearance frequency and a second appearance frequency, the first appearance frequency indicating an appearance frequency of a combination of the first word and the related word with the predetermined relationship in a plurality of example sentences, the second appearance frequency indicating an appearance frequency of a combination of the second word and the related word with the predetermined relationship in the plurality of example sentences;
   generate, when the second appearance frequency is larger by a predetermined value than the first appearance frequency, a translation rule for replacing the first word with the second word;
   translate an input sentence entered by a user based on the generated translation rule; and
   output the translated input sentence.

2. The machine translation apparatus according to claim 1,
   wherein when messages are translated, transmitted and received, the translation rule is updated using a feedback re resenting a meaning of the translated sentence and provided by another user who transmits and receives messages.

3. The machine translation apparatus according to claim 1,
   wherein the translation rule is performed based on determination of whether or not a node that has a specific modification relation with the difference.

4. The machine translation apparatus according to claim 1,
   wherein the translation rule is data set as a combination of a first word to be replaced, a second word to be used to determine that the replacing is to be executed, and a modification relation between the first word and the second word.

5. The machine translation apparatus according to claim 1,
   wherein translation from Japanese to English is executed.

6. The machine translation apparatus according to claim 1,
   wherein translation from English to Japanese is executed.

7. The machine translation apparatus according to claim 1, wherein
   the second input sentence being a sentence into which the first input sentence is rewritten so that the second translated sentence is a more accurate translation than the first translated sentence.

8. A machine translation apparatus configured to translate an input sentence and output a translated sentence in a target language, the machine translation apparatus comprising:
   a memory and;
   at least one processor coupled to the memory, the at least one processor configured to:
   obtain a first translated sentence generated by translating a first sentence and obtain a second translated sentence generated by translating a second sentence, the second sentence being rewritten from the first sentence, the first sentence and the second sentence being acquired from a server apparatus;
   acquire a difference between the first translated sentence and the second translated sentence;
   specify a first word in the first translated sentence corresponding to the difference, a second word in the second translated sentence corresponding to the difference and a related word that has a predetermined relationship with the first word and the second word, the related word being included in both of the first translated sentence and the second translated sentence;
   acquire a first appearance frequency and a second appearance frequency, the first appearance frequency indicating an appearance frequency of a combination of the first word and the related word with the predetermined relationship in a plurality of example sentences, the second appearance frequency indicating an appearance frequency of a combination of the second word and the related word with the predetermined relationship in the plurality of example sentences;

generate, when the second appearance frequency is larger by a predetermined value than the first appearance frequency, a translation rule for replacing the first word with the second word; and translate an input sentence based on the generated translation rule and output the translated input sentence, wherein the server apparatus is configured to enable at least two users to exchange messages through a network, the messages being translated by the machine translation apparatus and transmitted and received, the server apparatus enabling the machine translation apparatus to acquire the translation rule based on a feedback provided by any of the users.

9. A translation method comprising:

causing the computer to obtain a first translated sentence generated by translating a first input sentence and a second translated sentence generated by translating a second input sentence, the second input sentence being a sentence into which the first input sentence is rewritten;

causing the computer to acquire a difference between the first translated sentence and the second translated sentence;

causing the computer to specify a first word in the first translated sentence corresponding to the difference, a second word in the second translated sentence corresponding to the difference and a related word that has a predetermined relationship with the first word and the second word, the related word being included in both of the first translated sentence and the second translated sentence;

causing the computer to acquire a first appearance frequency and a second appearance frequency, the first appearance frequency indicating an appearance frequency of a combination of the first word and the related word with the predetermined relationship in a plurality of example sentences, the second appearance frequency indicating an appearance frequency of a combination of the second word and the related word with the predetermined relationship in the plurality of example sentences;

causing the computer to generate, when the second appearance frequency is larger by a predetermined value than the first appearance frequency, a translation rule for replacing the first word with the second word;

causing the computer to translate an input sentence entered by a user based on the generated translation rule; and causing the computer to output the translated input sentence.

* * * * *